United States Patent
Miyahara et al.

(10) Patent No.: US 10,559,284 B2
(45) Date of Patent: Feb. 11, 2020

(54) VEHICLE INFORMATION DISPLAY CONTROL DEVICE, AND METHOD FOR DISPLAYING AUTOMATIC DRIVING INFORMATION

(71) Applicant: Mitsubishi Electric Corporation, Tokyo (JP)

(72) Inventors: Tadashi Miyahara, Tokyo (JP); Mitsuo Shimotani, Tokyo (JP); Satoru Inoue, Tokyo (JP); Yoshio Sato, Tokyo (JP); Yuki Sakai, Tokyo (JP); Yuji Karita, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/065,933

(22) PCT Filed: Feb. 1, 2016

(86) PCT No.: PCT/JP2016/052953
§ 371 (c)(1),
(2) Date: Jun. 25, 2018

(87) PCT Pub. No.: WO2017/134733
PCT Pub. Date: Aug. 10, 2017

(65) Prior Publication Data
US 2019/0012988 A1 Jan. 10, 2019

(51) Int. Cl.
*G09G 5/377* (2006.01)
*B60K 35/00* (2006.01)
(Continued)

(52) U.S. Cl.
CPC ............ *G09G 5/377* (2013.01); *B60K 35/00* (2013.01); *G09G 3/001* (2013.01); *G09G 3/003* (2013.01);
(Continued)

(58) Field of Classification Search
CPC ........ G09G 3/001; G09G 3/003; G09G 5/024; G09G 5/377; G09G 2340/12;
(Continued)

(56) References Cited

U.S. PATENT DOCUMENTS

| 2009/0195375 A1* | 8/2009 | Berg ................... F16H 63/42 340/456 |
| 2015/0253804 A1* | 9/2015 | Baur ................... G05G 1/40 180/329 |
| 2016/0089979 A1* | 3/2016 | Bianchi ................... G06F 3/14 701/49 |

FOREIGN PATENT DOCUMENTS

JP 2015-24746 A 2/2015

OTHER PUBLICATIONS

International Search Report issued in PCT/JP2016/052953 (PCT/ISA/210), dated Apr. 26, 2016.

* cited by examiner

*Primary Examiner* — Jacinta M Crawford
(74) *Attorney, Agent, or Firm* — Birch, Stewart, Kolasch & Birch, LLP

(57) ABSTRACT

A vehicle information display control device includes: an automatic driving information obtaining unit that obtains automatic driving information including information indicating whether each of actuators of a vehicle is in a manual control mode or an automatic control mode; and a display controller that causes a display to display an image based on the automatic driving information. The display controller simultaneously displays a first image and a second image representing the manual control mode and the automatic control mode, respectively, of each of the actuators, and displays (i) the first image of an actuator in the manual control mode closer than the second image of the actuator in the manual control mode and (ii) the second image of an (Continued)

actuator in the automatic control mode closer than the first image of the actuator in the automatic control mode.

16 Claims, 18 Drawing Sheets

(51) Int. Cl.
*B60K 37/02* (2006.01)
*G09G 3/00* (2006.01)
*G09G 5/02* (2006.01)
*G06T 11/60* (2006.01)
*G06T 13/80* (2011.01)

(52) U.S. Cl.
CPC ........ *B60K 37/02* (2013.01); *B60K 2370/172* (2019.05); *B60K 2370/186* (2019.05); *B60K 2370/52* (2019.05); *G06T 11/60* (2013.01); *G06T 13/80* (2013.01); *G09G 5/024* (2013.01); *G09G 2340/12* (2013.01); *G09G 2380/10* (2013.01)

(58) Field of Classification Search
CPC ..... G09G 2380/10; G06T 11/60; G06T 13/80; B60K 35/00; B60K 37/02; B60K 2370/52; B60K 2370/172; B60K 2370/186
See application file for complete search history.

F I G . 3
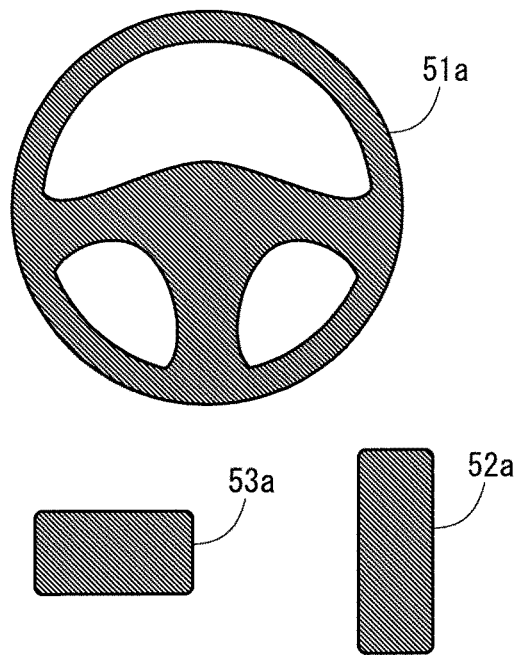
F I G . 4
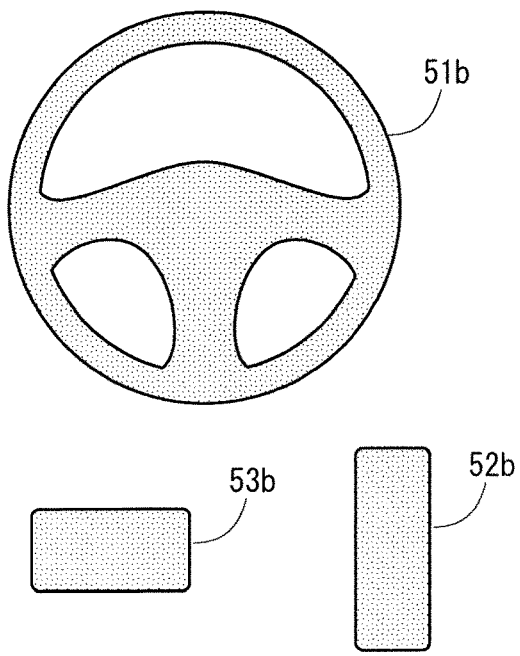

F I G . 1 6
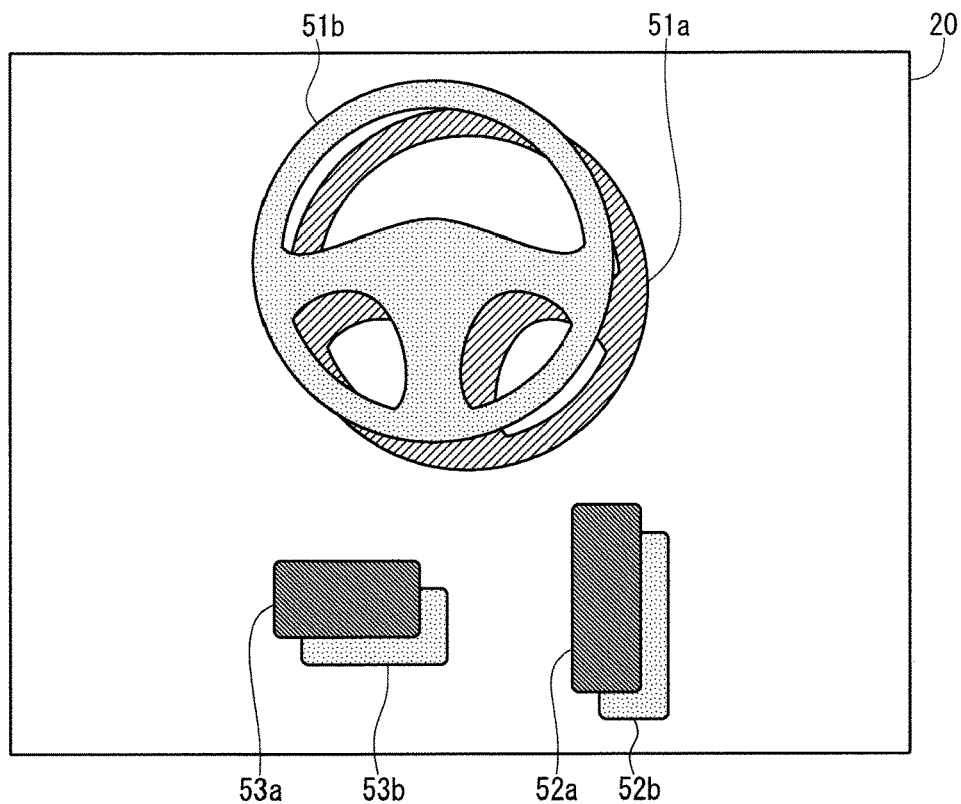
F I G . 1 7
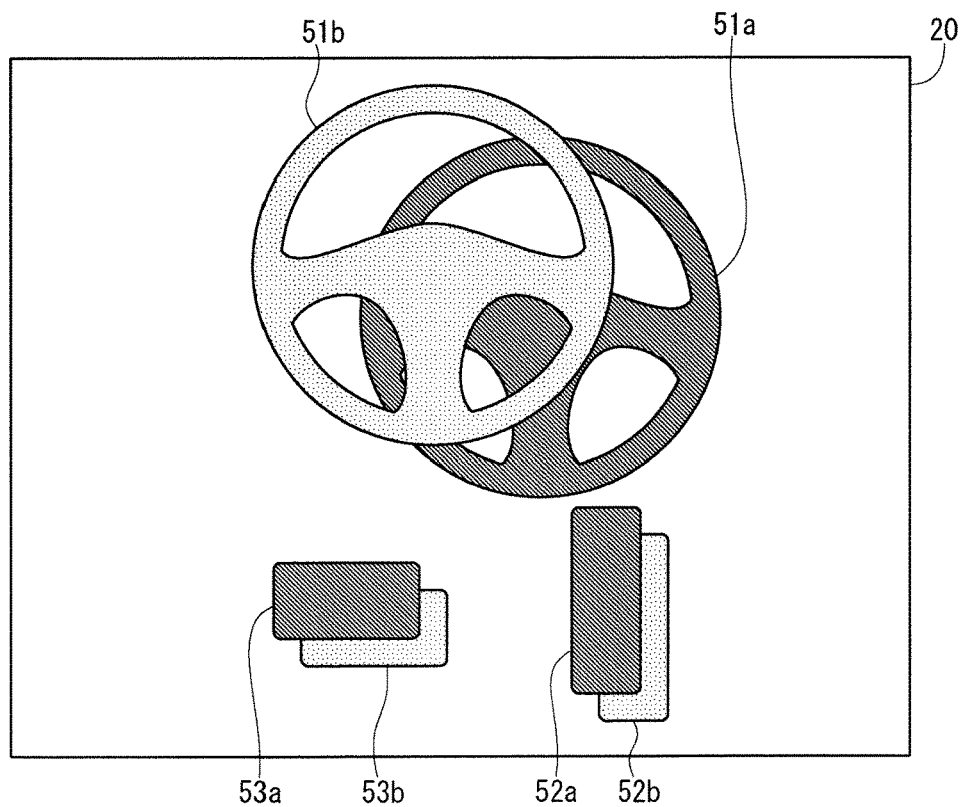

(MORE THAN 20 MINUTES LEFT UP TO MANUAL STEERING REQUIRED SECTION)

(20 MINUTES LEFT UP TO MANUAL STEERING REQUIRED SECTION)

(10 MINUTES LEFT UP TO MANUAL STEERING REQUIRED SECTION)

(1 MINUTE LEFT UP TO MANUAL STEERING REQUIRED SECTION)

(AFTER BEING SWITCHED TO MANUAL DRIVING MODE)

FIG. 37A
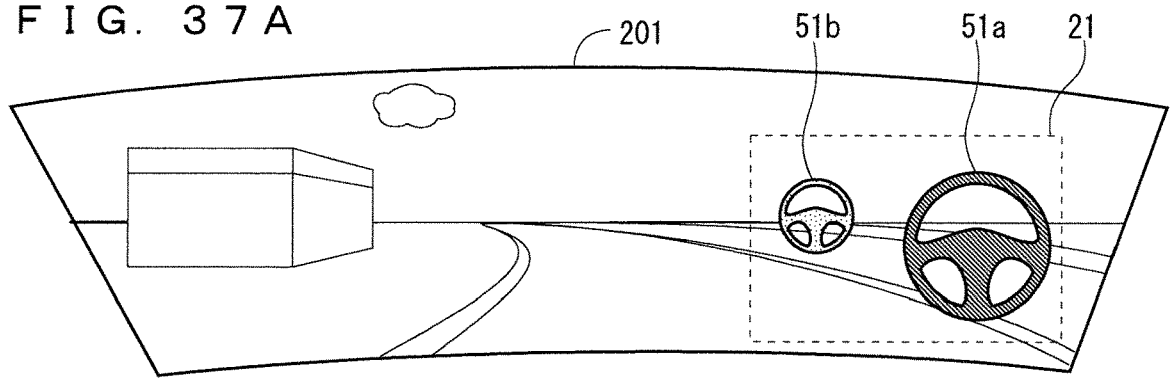
FIG. 37B
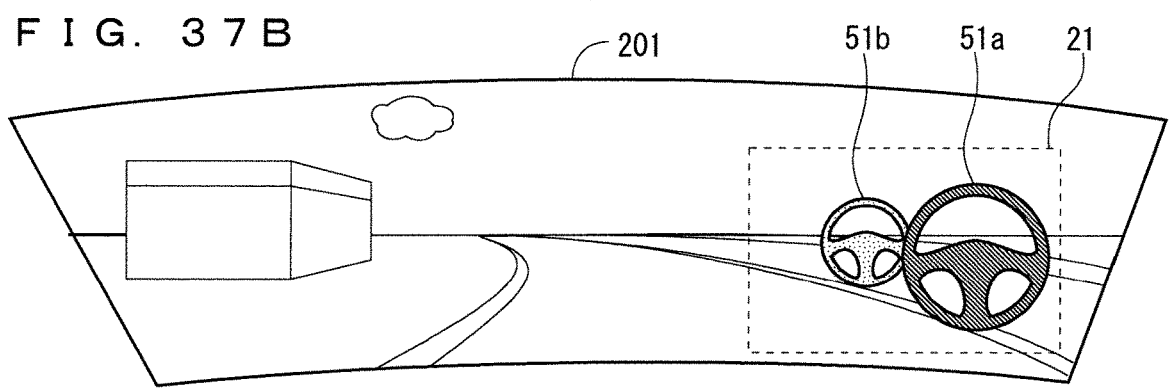
FIG. 37C
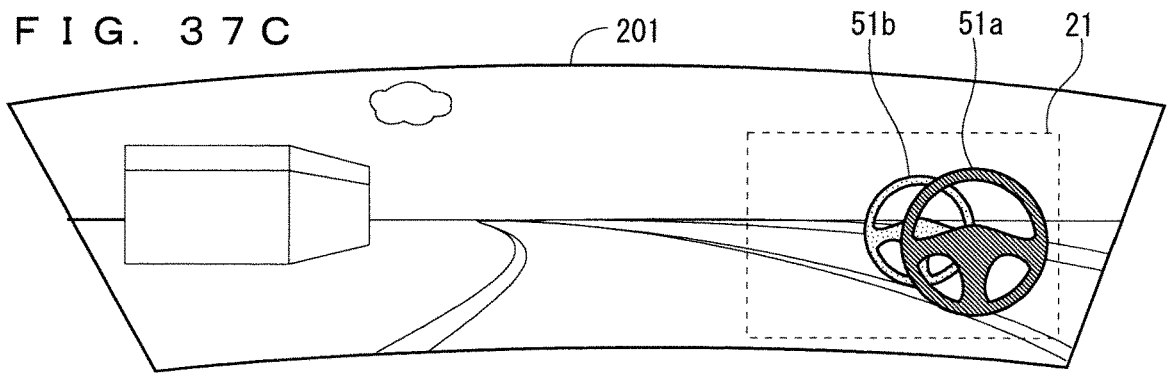
FIG. 37D
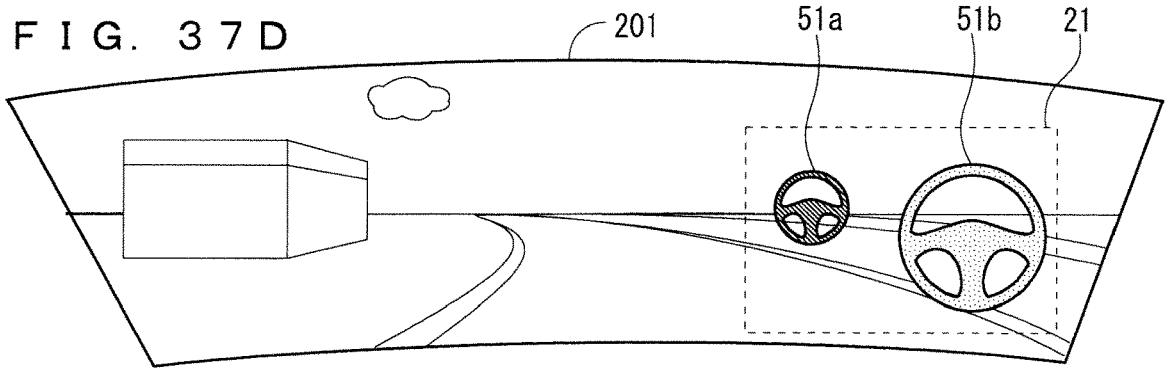

VEHICLE INFORMATION DISPLAY CONTROL DEVICE, AND METHOD FOR DISPLAYING AUTOMATIC DRIVING INFORMATION

TECHNICAL FIELD

The present invention relates to a vehicle information display control device, and particularly to a method for displaying automatic driving information.

BACKGROUND ART

For example, Patent Document 1 below discloses a technique for presenting levels of automation to a driver in switching a manual driving mode of a vehicle to an automatic driving mode stepwise to resolve the discomfort of the driver in the automatic driving mode.

PRIOR ART DOCUMENTS

Patent Documents

Patent Document 1: Japanese Patent Application Laid-Open No. 2015-24746

SUMMARY

Problem to be Solved by the Invention

In Patent Document 1, the levels of automation to be presented to the driver are represented by numerical values such as 1, 2, and 3. Although the driver can roughly understand a degree (percentage) of the automation, the driver has difficulties in understanding, among actuators of the vehicle (for example, a steering, an accelerator, a brake, and a shifter), which one is automatically controlled and which one is manually controlled.

The present invention has been conceived to solve such a problem, and has an object of providing a vehicle information display control device that allows the driver to easily understand a control mode (an automatic control mode or a manual control mode) of each of the actuators.

Means to Solve the Problem

A vehicle information display control device according to the present invention includes: an automatic driving information obtaining unit to obtain automatic driving information including information indicating whether each of actuators of a vehicle is in a manual control mode or an automatic control mode; and a display controller to cause a display to display an image based on the automatic driving information, the image representing a control mode of each of the actuators, wherein a first image and a second image are defined for each of the actuators, the first image representing the manual control mode, the second image representing the automatic control mode, and the display controller causes the display to simultaneously display the first image and the second image of each of the actuators and to display (i) the first image of an actuator in the manual control mode closer than the second image of the actuator in the manual control mode and (ii) the second image of an actuator in the automatic control mode closer than the first image of the actuator in the automatic control mode.

Effects of the Invention

In the vehicle information display control device according to the present invention, the depth relationship between the first image and the second image of each of the actuators to be displayed on a display is switched according to the control mode of the corresponding one of the actuators. Thus, the driver can easily understand the control mode of each of the actuators, based on the depth relationship between the first image and the second image of the actuator.

The object, features, aspects and advantages of this invention will become more apparent from the following detailed description and the accompanying drawings.

BRIEF DESCRIPTION OF DRAWINGS

FIG. 3 illustrates an example first image of each actuator.

FIG. 4 illustrates an example second image of each actuator.

FIG. 16 illustrates a display example of the automatic driving information.

FIG. 17 illustrates a display example of the automatic driving information.

FIGS. 37A to 37D illustrates a display example of the distance or the time up to the automatic steerable section.

DESCRIPTION OF EMBODIMENTS

Embodiment 1

Figure 1:
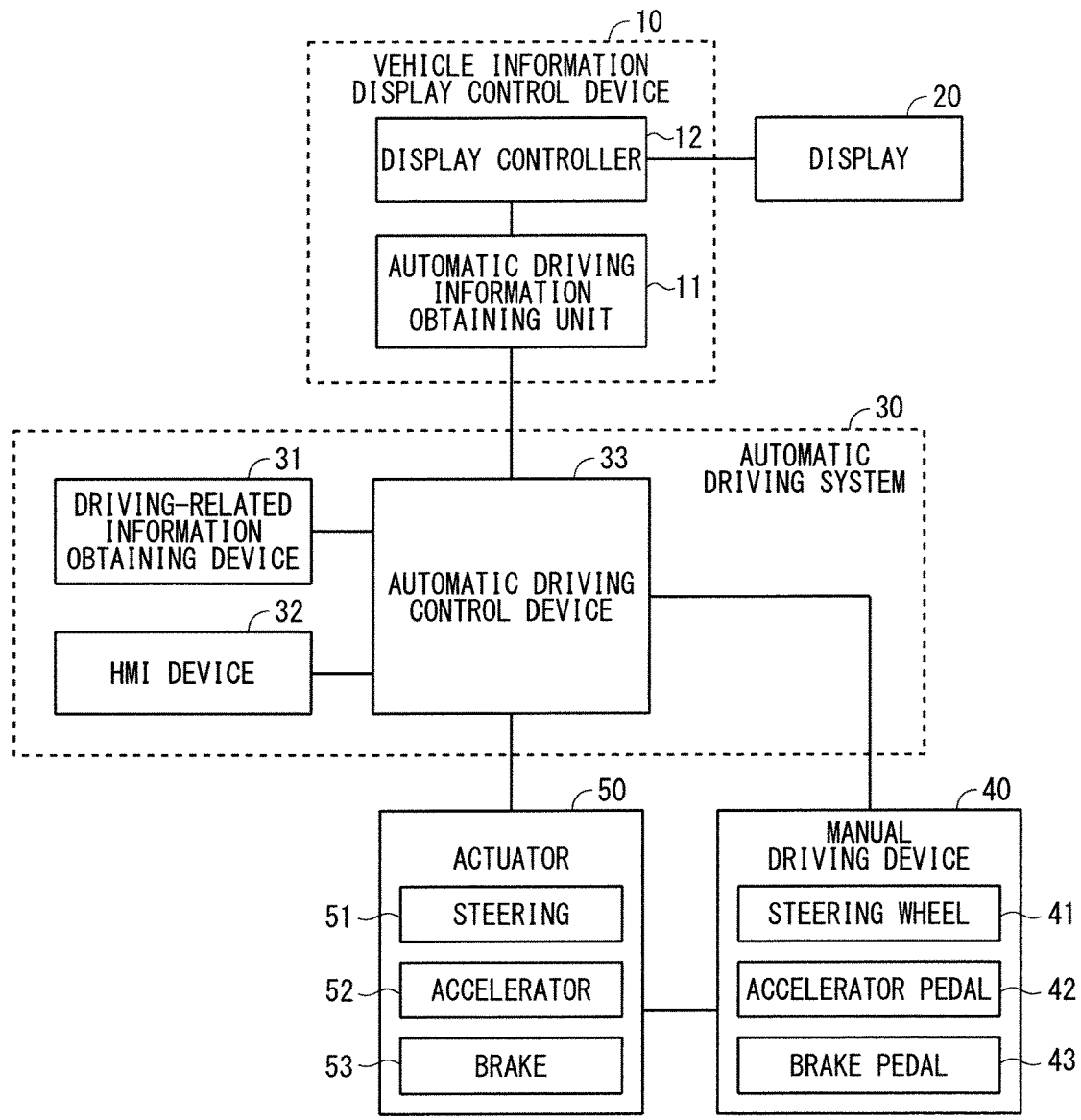
FIG. 1 is a block diagram illustrating a configuration of a driving assistance system according to Embodiment 1 of the present invention.

FIG. 1 is a block diagram illustrating a configuration of a driving assistance system according to Embodiment 1 of the present invention. As illustrated in FIG. 1, the driving assistance system includes a vehicle information display control device 10, a display 20, an automatic driving system 30, a manual driving device 40, and an actuator 50. Hereinafter, a vehicle equipped with the driving assistance system will be referred to as a "subject vehicle".

The actuator 50 is a device for controlling traveling of the subject vehicle, and includes a plurality of elements such as a steering 51, an accelerator 52 (throttle), and a brake 53 (each of these elements may be referred to as an "actuator"). Besides, the actuator 50 may also include a shifter (gear) and a lighting device (for example, a head lamp and a blinker).

The manual driving device 40 is a device allowing the driver to control the actuator 50 through a manual operation, and includes a steering wheel 41 for operating the steering 51, an accelerator pedal 42 for operating the accelerator 52, and a brake pedal 43 for operating the brake 53. Besides, the manual driving device 40 may include a shift lever for operating the shifter and a switch for operating the lighting device.

The automatic driving system 30 is a system for automatically controlling the actuator 50, and includes a driving-related information obtaining device 31, a Human-Machine Interface (HMI) device 32, and an automatic driving control device 33.

The driving-related information obtaining device 31 includes various sensors and a communication device, and obtains various pieces of information related to the driving of the subject vehicle (driving-related information). Examples of the driving-related information include information on obstructions around the subject vehicle (for example, pedestrians, the other vehicles, and features), map information, information on the current position of the subject vehicle, information on a planned travel route of the subject vehicle, traffic information (for example, traffic jam information and construction information), and information indicating a state of the driver (for example, an arousal level, a gaze point, and a limb position).

The HMI device 32 is a user interface for the driver (user) of the subject vehicle to input an instruction to the automatic driving control device 33, and for the automatic driving control device 33 to present the various pieces of information to the driver. Input means of the HMI device 32 may be pieces of hardware such as an operation button, a keyboard, and a remote control switch, or a software key using a button (icon) displayed on a screen. Means for outputting information include a display and an audio output device. When a software key functioning as the input means is displayed on a display functioning as the output means, the HMI device 32 may be configured as a touch panel.

The automatic driving control device 33 automatically controls the actuator 50 based on the driving-related information obtained by the driving-related information obtaining device 31 and the instruction of the driver input to the HMI device 32.

Hereinafter, a control mode in which the automatic driving system 30 (the automatic driving control device 33) automatically controls the actuator 50 will be referred to as an "automatic control mode", and a control mode in which the actuator 50 is controlled by a manual operation of the driver using the manual driving device 40 will be referred to as a "manual control mode". The control mode may be set to each of the elements of the actuator 50. For example, when all of the steering 51, the accelerator 52, and the brake 53 are in the manual control mode, only the steering 51 may be shifted to the automatic control mode, and the accelerator 52 and the brake 53 may be maintained in the manual control mode.

The vehicle information display control device 10 includes an automatic driving information obtaining unit 11 and a display controller 12. The automatic driving information obtaining unit 11 obtains automatic driving information from the automatic driving control device 33. The automatic driving information includes information at least indicating whether each of the actuators (the steering 51, the accelerator 52, and the brake 53) of the subject vehicle is in the manual control mode or the automatic control mode. The display controller 12 controls the display 20 based on the automatic driving information obtained by the automatic driving information obtaining unit 11. The display controller 12 causes the display 20 to display an image representing the control mode of each of the actuators.

Figure 2:
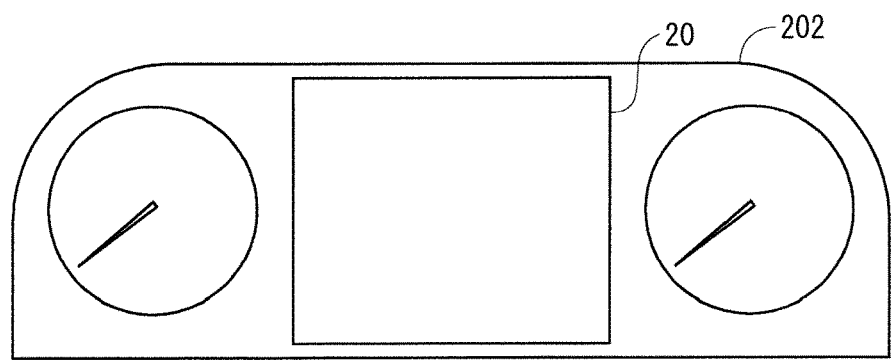
FIG. 2 illustrates an example display according to Embodiment 1.

The display 20 according to Embodiment 1 is a flat-panel display such as a liquid crystal display. Here, the display 20 is preferably placed in a meter cluster 202 at the driver's seat as illustrated in FIG. 2. Although not limited to this, the display 20 may be disposed, for example, in a center panel of a dash board (between the driver's seat and the front passenger seat).

In the driving assistance system, a first image representing the manual control mode and a second image representing the automatic control mode are defined for each of the actuators. According to Embodiment 1, a manual steering image 51*a* that is the first image of the steering 51, a manual accelerator image 52*a* that is the first image of the accelerator 52, and a manual brake image 53*a* that is the first image of the brake 53 are defined in the FIG. 3, whereas an automatic steering image 51*b* that is the second image of the steering 51, an automatic accelerator image 52*b* that is the second image of the accelerator 52, and an automatic brake image 53*b* that is the second image of the brake 53 are defined in the FIG. 4.

As illustrated in FIGS. 3 and 4 according to Embodiment 1, the manual steering image 51a and the automatic steering image 51b are shaped like the steering wheel 41, the manual accelerator image 52a and the automatic accelerator image 52b are shaped like the accelerator pedal 42, and the manual brake image 53a and the automatic brake image 53b are shaped like the brake pedal 43. The shapes of the first image and the second image of each of the actuators are preferably in an identical (including being similar) or similar relationship to each other. Examples of the similar relationship include a relationship in which only portions of the images differ, a relationship in which aspect ratios of the images differ, and a relationship between a three-dimensional shape and a two-dimensional shape.

The first image representing the manual control mode is preferably more prominent (visible) than the second image representing the automatic control mode so that the driver strongly recognizes which actuator needs to be manually operated. Example ideas include making the first image darker or lighter than the second image, and rendering the outline of the first image using a solid line and the outline of the second image using a broken line. Although the first image is diagonally patterned in FIG. 3 and the second image is sand patterned in FIG. 4 for convenience of illustration, in reality, the first image is colored blue and the second image is colored gray (generally, blue is considered more visible than gray).

The display controller 12 causes the display 20 to simultaneously display the first image and the second image of each of the actuators to represent the control modes of the actuator according to a depth relationship between the first image and the second image that are displayed. In other words, the display controller 12 displays the first image of an actuator in the manual control mode closer than the second image of the actuator in the manual control mode, and displays the second image of an actuator in the automatic control mode closer than the first image of the actuator in the automatic control mode. Here, the "closer" means a position closer to the driver of the vehicle. Conversely, a position further from the driver will be expressed by the term "deeper".

Figure 5:
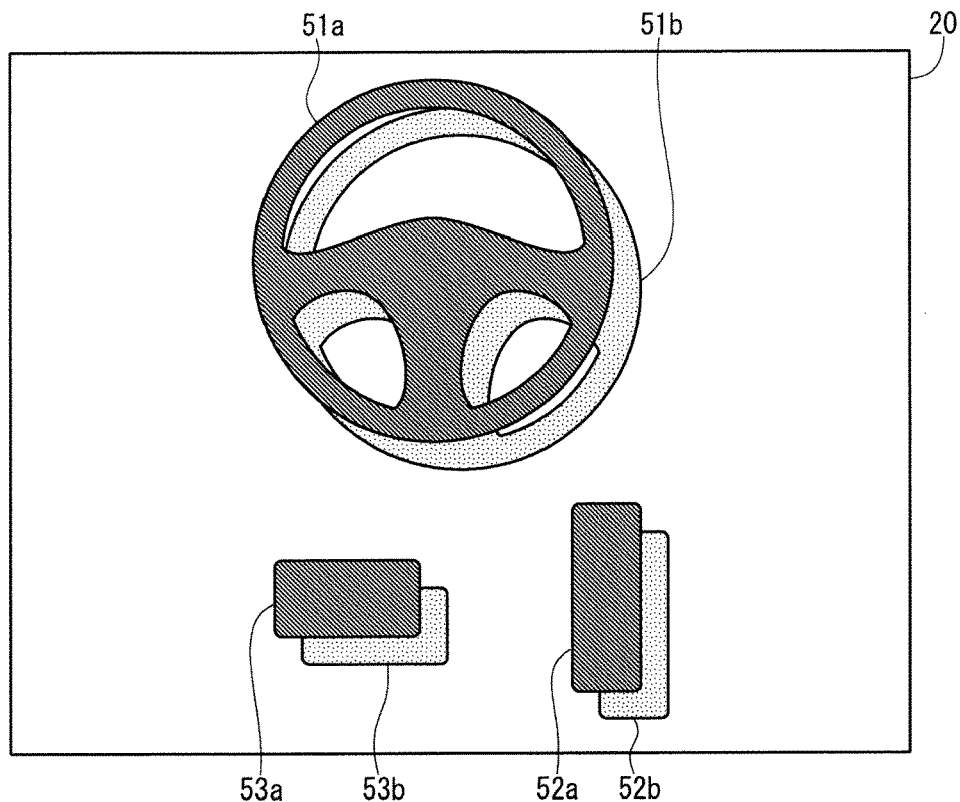
FIG. 5 illustrates a display example of automatic driving information.

For example, when all of the steering 51, the accelerator 52, and the brake 53 are in the manual control mode, the display controller 12 displays the manual steering image 51a, the manual accelerator image 52a, and the manual brake image 53a closer than the automatic steering image 51b, the automatic accelerator image 52b, and the automatic brake image 53b, respectively, as illustrated in FIG. 5. Here, the display controller 12 displays the first image and the second image overlaid on one another so that a display position of the first image deviates from a display position of the second image to clarify the depth relationship between the first image and the second image. The driver who views the resulting image displayed on the display 20 can recognize that the steering 51, the accelerator 52, and the brake 53 are in the manual control mode.

Figure 6:
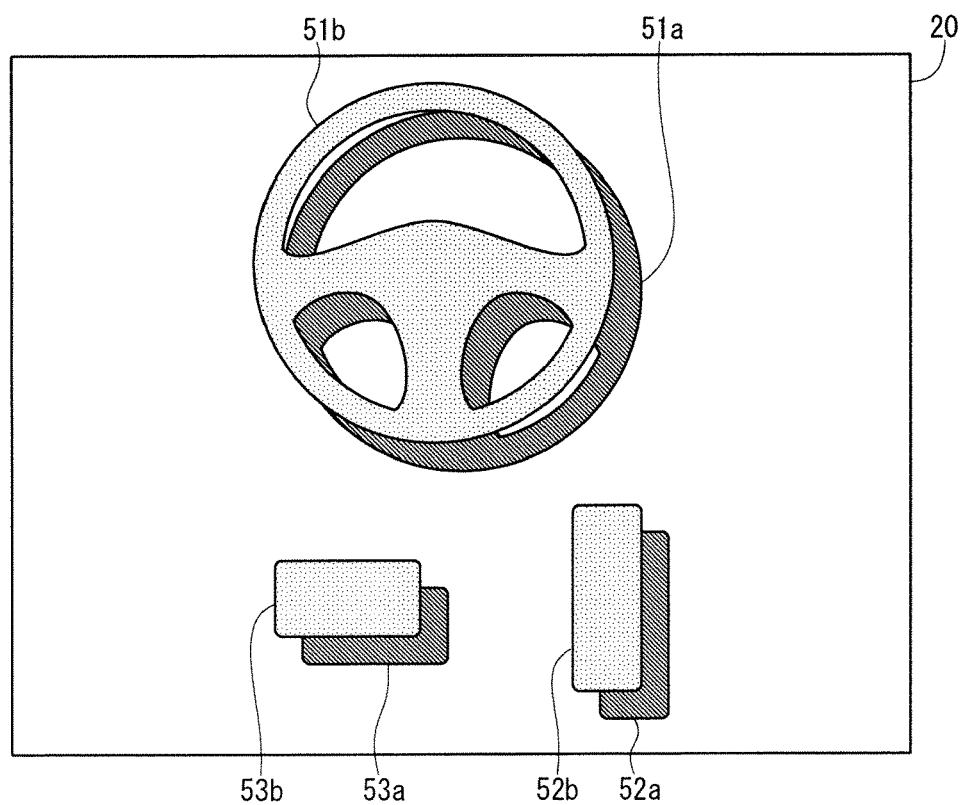
FIG. 6 illustrates a display example of the automatic driving information.

Conversely, when all of the steering 51, the accelerator 52, and the brake 53 are in the automatic control mode, the display controller 12 displays the automatic steering image 51b, the automatic accelerator image 52b, and the automatic brake image 53b closer than the manual steering image 51a, the manual accelerator image 52a, and the manual brake image 53a, respectively, as illustrated in FIG. 6. The driver who views the resulting image displayed on the display 20 can recognize that the steering 51, the accelerator 52, and the brake 53 are in the automatic control mode.

Figure 7:
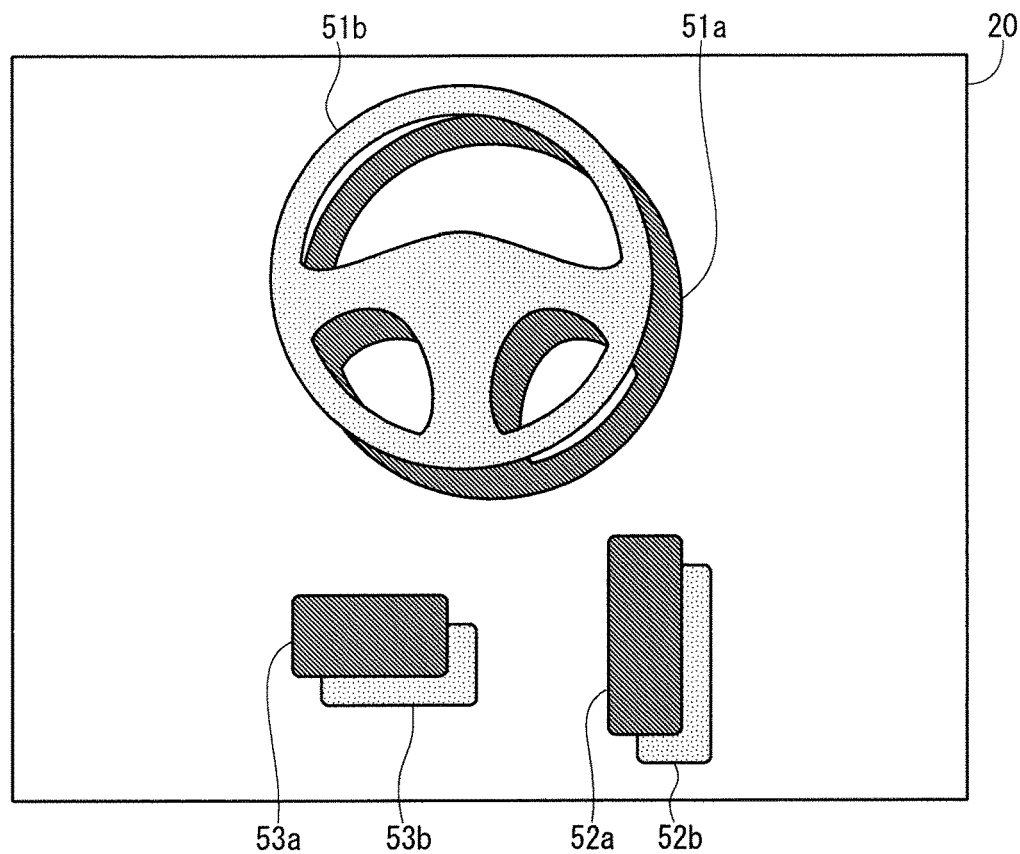
FIG. 7 illustrates a display example of the automatic driving information.

When there is a mix of actuators in the manual control mode and the actuators in the automatic control mode, the display controller 12 displays the first image of an actuator in the manual control mode closer than the second image of the actuator in the manual control mode, and displays the second image of an actuator in the automatic control mode closer than the first image of the actuator in the automatic control mode. For example, when only the steering 51 is set to the automatic control mode and the accelerator 52 and the brake 53 are in the manual control mode, the automatic steering image 51b is displayed closer than the manual steering image 51a, and the manual accelerator image 52a and the manual brake image 53a are displayed closer than the automatic accelerator image 52b and the automatic brake image 53b, respectively, as illustrated in FIG. 7. The driver who views the resulting image displayed on the display 20 can recognize that only the steering 51 is in the automatic control mode.

Figure 8:
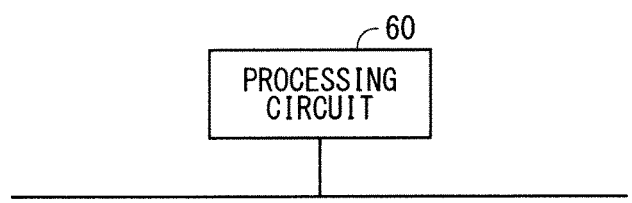
FIG. 8 illustrates an example hardware configuration of a vehicle information display control device.
Figure 9:
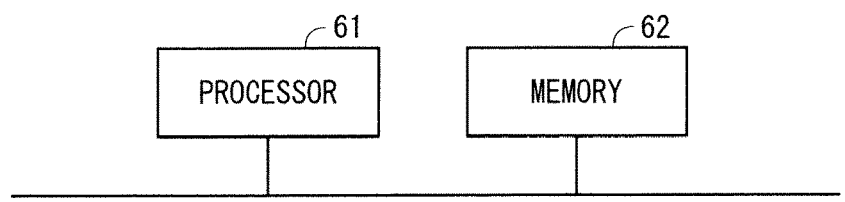
FIG. 9 illustrates an example hardware configuration of the vehicle information display control device.

FIGS. 8 and 9 each illustrate an example hardware configuration of the vehicle information display control device 10. The automatic driving information obtaining unit 11 and the display controller 12 of the vehicle information display control device 10 can be implemented by, for example, a processing circuit 60 illustrated in FIG. 8. In other words, the processing circuit 60 includes the automatic driving information obtaining unit 11 that obtains automatic driving information from the automatic driving system 30, and the display controller 12 that causes the display 20 to display the first image and the second image to represent the control mode of each of the actuators according to the depth relationship between the first image and the second image. This processing circuit 60 may be dedicated hardware, or a processor (a central processing unit, a CPU, a processing unit, an arithmetic unit, a microprocessor, a microcomputer, or a digital signal processor) that executes a program stored in a memory.

When the processing circuit 60 is dedicated hardware, examples of the processing circuit 60 include a single circuit, a composite circuit, a programmed processor, a parallel-programmed processor, an ASIC, a FPGA, and any combination of these. Each of the functions of the automatic driving information obtaining unit 11 and the display controller 12 may be implemented by a plurality of the processing circuits 60 or by the one processing circuit 60 collectively.

FIG. 9 illustrates a hardware configuration of the vehicle information display control device 10 when a processor is configured as the processing circuit 60. The functions of the automatic driving information obtaining unit 11 and the display controller 12 are implemented by any combinations with software (software, firmware, or the software and the firmware). For example, the software is described as a program, and stored in a memory 62. A processor 61 functioning as the processing circuit 60 implements the functions of each of the unit and the controller by reading and executing the program stored in the memory 62. In other words, the vehicle information display control device 10 includes the memory 62 for storing a program which, when executed by the processing circuit 60, consequently executes the steps of: obtaining automatic driving information from the automatic driving system 30; and causing the display 20 to display the first image and the second image to represent the control mode of each of the actuators according to the depth relationship between the first image and the second image. Put it differently, this program causes a computer to execute procedures or methods of operations of the automatic driving information obtaining unit 11 and the display controller 12.

Here, examples of the memory 62 include: non-volatile or volatile semiconductor memories such as a random access memory (RAM), a read only memory (ROM), a flash memory, an erasable programmable read only memory (EPROM), and an electrically erasable programmable read only memory (EEPROM); and a hard disk drive (HDD), a magnetic disk, a flexible disk, an optical disk, a compact disk, a mini disk, and a digital versatile disc (DVD) and their drive devices.

The configuration for implementing each of the functions of the automatic driving information obtaining unit 11 and the display controller 12 by, for example, one of software and hardware is described above. The configuration is not limited to such, but part of the automatic driving information obtaining unit 11 and the display controller 12 may be implemented by dedicated hardware or another part thereof may be implemented by, for example, software. For example, a processing circuit that is dedicated hardware can implement the functions of the automatic driving information obtaining unit 11, whereas the processing circuit 60 functioning as the processor 61 can implement the functions of the display controller 12 by reading and executing the program stored in the memory 62.

As described above, the processing circuit 60 can implement each of the functions above using hardware, software, or a combination of these.

Figure 10:
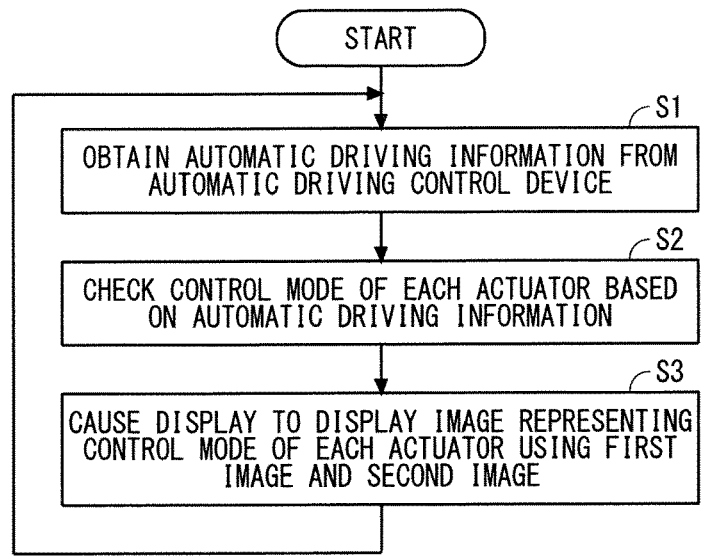
FIG. 10 is a flowchart indicating operations of the vehicle information display control device according to the present invention.

Next, the operations of the vehicle information display control device 10 according to Embodiment 1 will be described. FIG. 10 is a flowchart indicating the operations thereof.

Upon start of the vehicle information display control device 10, the automatic driving information obtaining unit 11 obtains, from the automatic driving control device 33, the automatic driving information including information on a control mode (the manual control mode or the automatic control mode) of each of the actuators (Step S1).

The display controller 12 checks the control mode of each of the actuators based on the automatic driving information obtained by the automatic driving information obtaining unit 11 (Step S2). Then, the display controller 12 causes the display 20 to display an image representing the control mode of each of the actuators using the first image (the manual steering image 51*a*, the manual accelerator image 52*a*, the manual brake image 53*a*) and the second image (the automatic steering image 51*b*, the automatic accelerator image 52*b*, the automatic brake image 53*b*) of the actuator (Step S3) as illustrated in FIGS. 5 to 7. The vehicle information display control device 10 repeats this series of operations.

Since the depth relationship between the first image and the second image of each of the actuators to be displayed on the display 20 is switched according to the control mode of the actuator in the driving assistance system according to Embodiment 1, the driver can easily understand the control mode of the actuator from the display.

The display controller 12 may use the animation effect when switching the depth relationship between the first image and the second image. Example ideas include animation of turning the first image and the second image upside down and switching the depth relationship between the first image and the second image, and animation of oscillating, rotating, or blinking the first image and the second image immediately before the depth relationship between the images is switched. Adding such movement enables the driver to more reliably recognize the switching of the control mode of each of the actuators.

Figure 11:
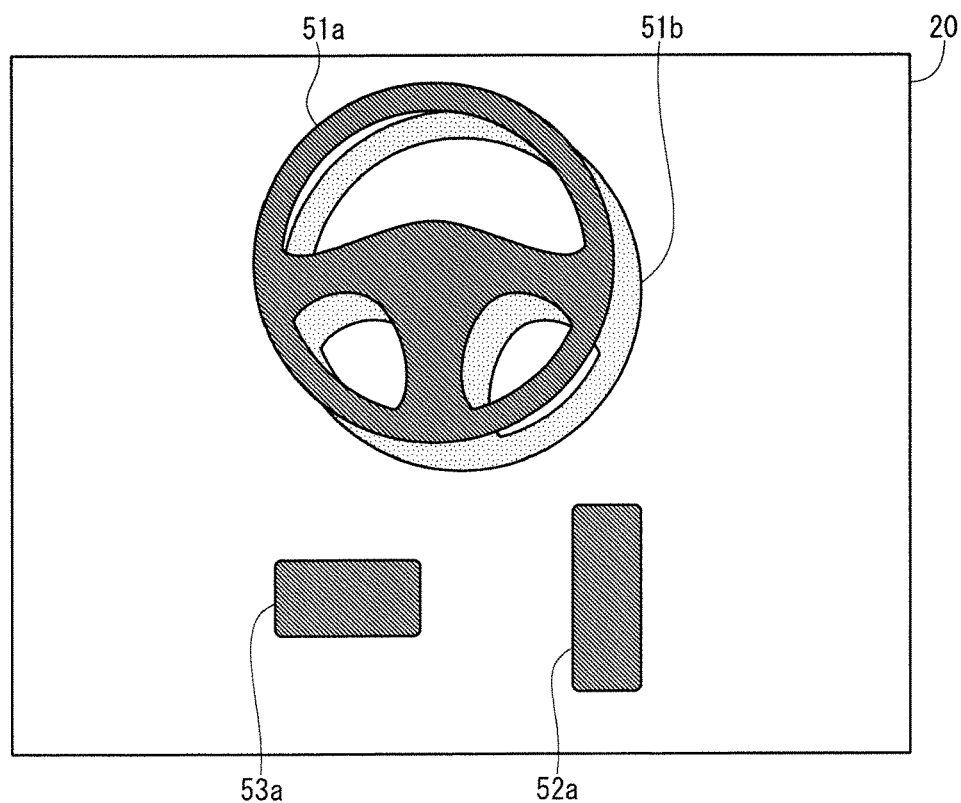
FIG. 11 illustrates a display example of the automatic driving information.

Although FIGS. 5 to 7 illustrate the examples of displaying the first images and the second images of all of the steering 51, the accelerator 52, and the brake 53 based on the assumption that the steering 51, the accelerator 52, and the brake 53 may be switched to the automatic control mode, part of the actuators may not be in the automatic control mode depending on the setting of an operation mode of the subject vehicle. For example, when the vehicle begins to move out of its lane, the steering 51 is switched to the automatic control mode while the accelerator 52 and the brake 53 are always maintained in the manual control mode under a general lane departure prevention mode. When the vehicle is set to such an operation mode, the second images of the actuators that cannot be in the automatic control mode may be omitted from being displayed. For example, in an operation mode allowing only the steering 51 to be in the automatic control mode and the accelerator 52 and the brake 53 to be always maintained in the manual control mode, both the first image and the second image of the steering 51 (the manual steering image 51*a* and the automatic steering image 51*b*) and only the first images of the accelerator 52 and the brake 53 (the manual accelerator image 52*a* and the manual brake image 53*a*) may be displayed without the second images of the accelerator 52 and the brake 53 (the automatic accelerator image 52*b* and the automatic brake image 53*b*) as illustrated in FIG. 11.

Figure 12:
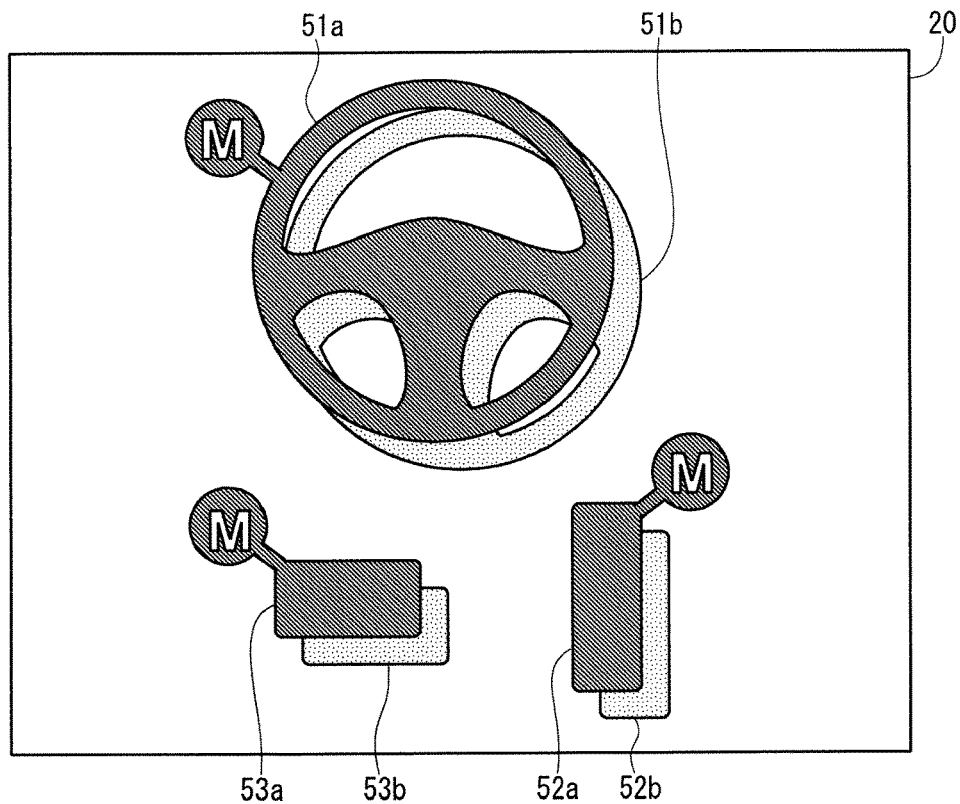
FIG. 12 illustrates a display example of the automatic driving information.
Figure 13:
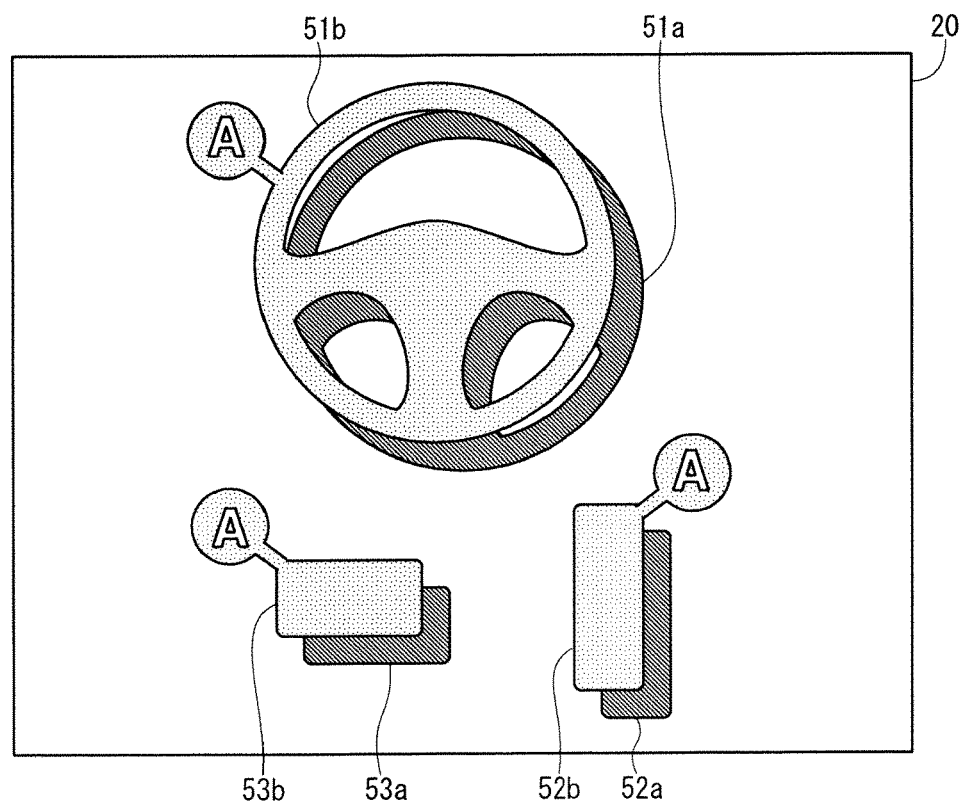
FIG. 13 illustrates a display example of the automatic driving information.
Figure 14:
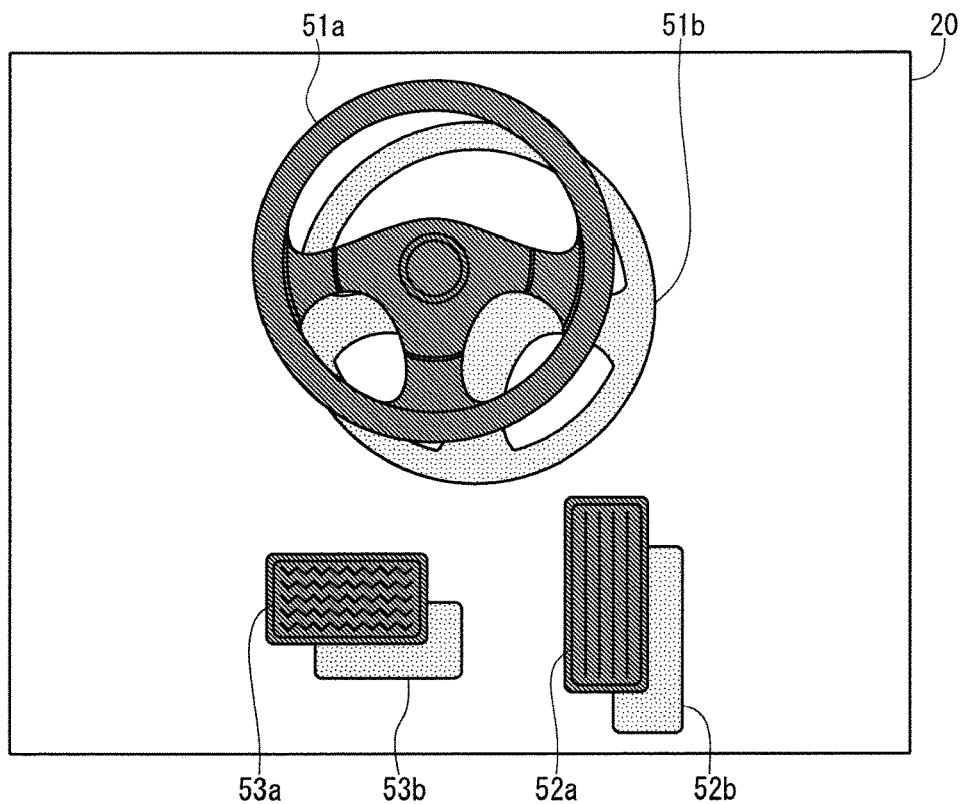
FIG. 14 illustrates a display example of the automatic driving information.
Figure 15:
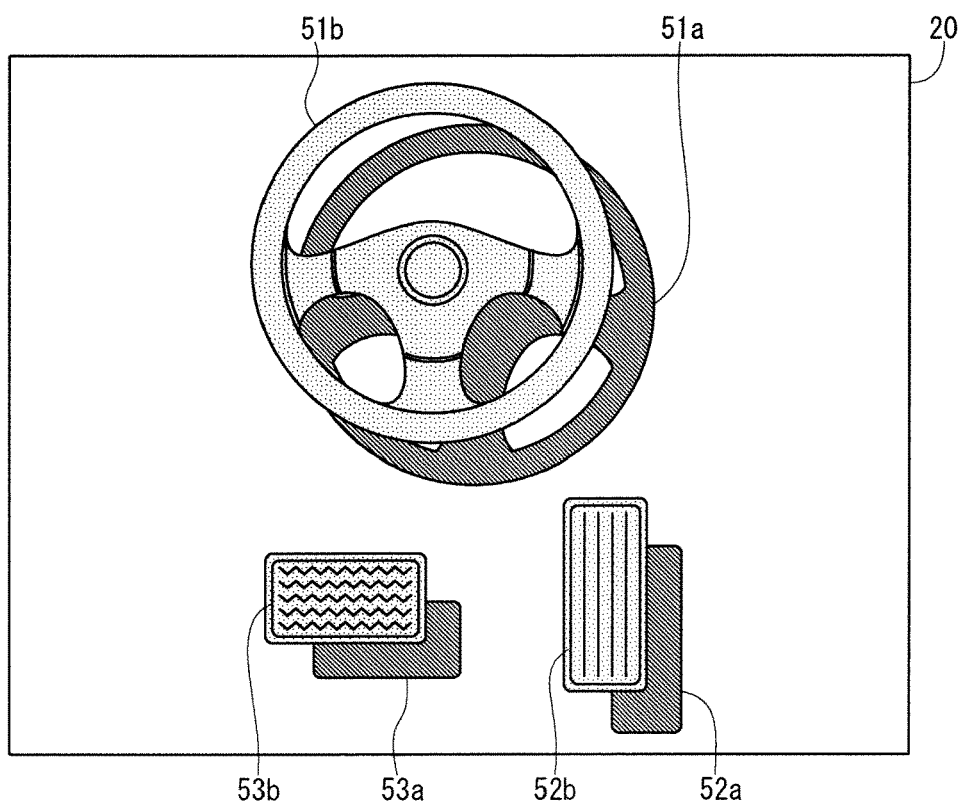
FIG. 15 illustrates a display example of the automatic driving information.

The display controller 12 may change display modes of the first images and the second images of the actuators, depending on whether the images are displayed closer or deeper. For example, when the manual steering image 51*a*, the manual accelerator image 52*a*, and the manual brake image 53*a* that are the first images are displayed closer, the images may be changed to the ones each with the letter "M" as illustrated in FIG. 12. When the automatic steering image 51*b*, the automatic accelerator image 52*b*, and the automatic brake image 53*b* that are the second images are displayed closer, the images may be changed to the ones each with the letter "A" as illustrated in FIG. 13. The first images or the second images that are displayed closer may be changed to, for example, more realistic-looking images as illustrated in FIGS. 14 and 15.

Here, the automatic control mode may have two types, one allowing intervention with a manual operation (being shifted to the manual control mode upon a manual operation) and the other not allowing the intervention. Here, the automatic driving information obtained by the vehicle information display control device 10 may include information indicating whether the automatic control mode of each of the actuators allows intervention with a manual operation. Then, the type of the automatic control mode may be determined from the image displayed on the display 20.

One of the possible methods is to represent whether the automatic control mode allows intervention with a manual operation, by a display mode or a display position of the first image displayed deeper in the automatic control mode. For example, when the steering 51 is in the automatic control mode that allows intervention with a manual operation, the image may be displayed as illustrated in FIG. 7. When the steering 51 is in the automatic control mode that does not allow any intervention with a manual operation, as illustrated in FIG. 16, the manual steering image 51*a* displayed deeper may be displayed in a less prominent mode (for example, reducing the color or rendering its outline using a broken line) than that in FIG. 7. When the steering 51 is in the automatic control mode that does not allow any intervention with a manual operation, as illustrated in FIG. 17, the manual steering image 51*a* may be displayed more separate from the automatic steering image 51*b* than that illustrated in FIG. 7.

Figure 18:
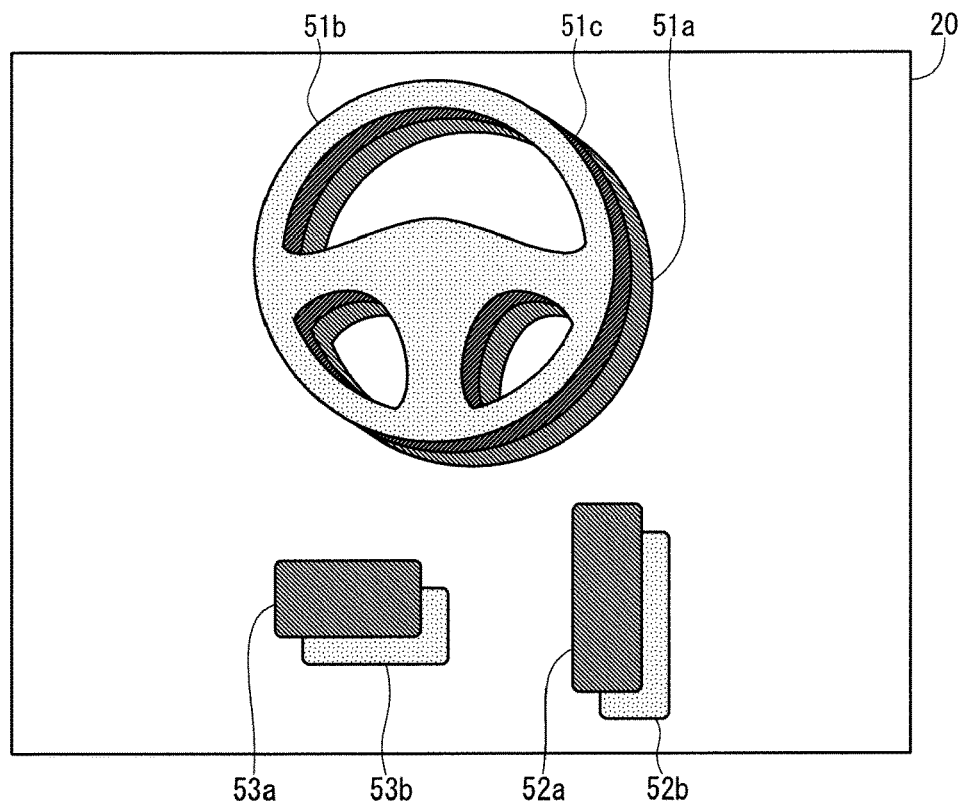
FIG. 18 illustrates a display example of the automatic driving information.

The other possible method is to display the third image for notifying whether the automatic control mode of each of the actuators allows intervention with a manual operation. For example, when the steering 51 is in the automatic control mode that does not allow any intervention with a manual operation, the image may be displayed as illustrated in FIG. 7. When the steering 51 is in the automatic control mode that allows intervention with a manual operation, a notification image 51*c* may be displayed as the third image between the automatic steering image 51*b* and the manual steering image 51*a* as illustrated in FIG. 18.

Some roads are defined to permit the automatic control mode of each of the actuators. It is presumed that, for example, the automatic driving mode is only permitted on a motorway such as a highway. In such a case, the automatic driving control device 33 can determine, from the map information and the information on the current position of the subject vehicle, whether the automatic control mode is permitted on a road on which the subject vehicle is traveling. The automatic driving control device 33 can also determine, from the planned travel route of the subject vehicle, a distance or a time until the actuator in the automatic control mode needs to be switched to the manual control mode or a distance or a time until the actuator in the manual control mode can be switched to the automatic control mode.

Here, the automatic driving information obtained by the vehicle information display control device 10 may include information on the distance or the time until the actuator in the automatic control mode needs to be switched to the manual control mode and information on the distance or the time until the actuator in the manual control mode can be switched to the automatic control mode. Then, these pieces of information may be notified to the user through the image displayed on the display 20.

Figure 19:
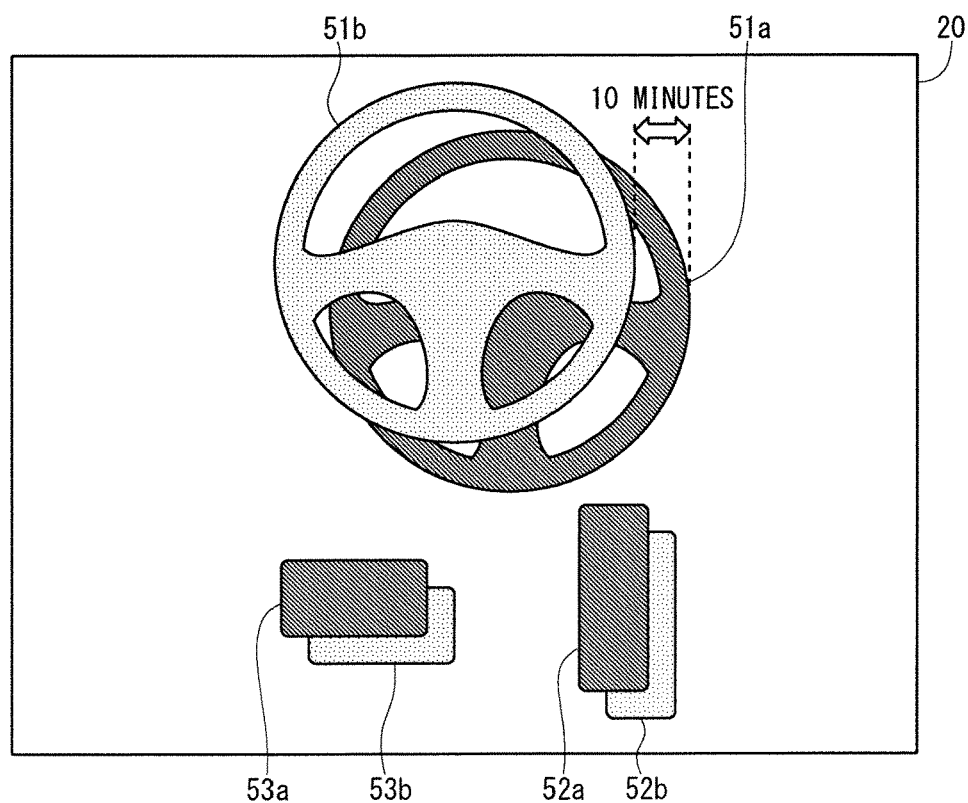
FIG. 19 illustrates a display example of a distance or a time up to a manual steering required section.

FIG. 19 illustrates an example of displaying a time until the subject vehicle reaches a section where the steering 51 needs to be switched to the manual control mode (a manual steering required section), using a difference (distance) in display position between the automatic steering image 51*b* and the manual steering image 51*a*. As illustrated in FIG. 19, a value indicating the time (or distance) until the subject vehicle reaches the manual steering required section may be displayed on the display 20. FIGS. 20A to 20E illustrate change in the display position between the manual steering image 51*a* and the automatic steering image 51*b* in such a case.

Figure 20A:
FIGS. 20A to 20E illustrate example change in the display when the distance or the time up to the manual steering required section is displayed.
Figure 20B:
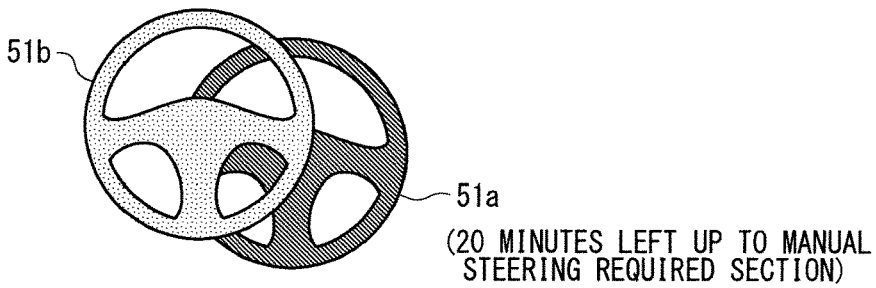
Figure 20C:
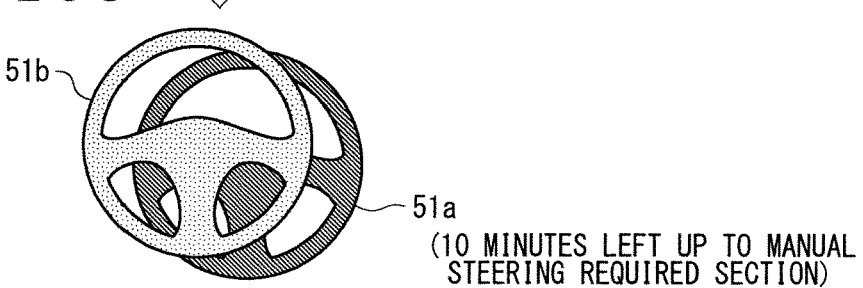
Figure 20D:
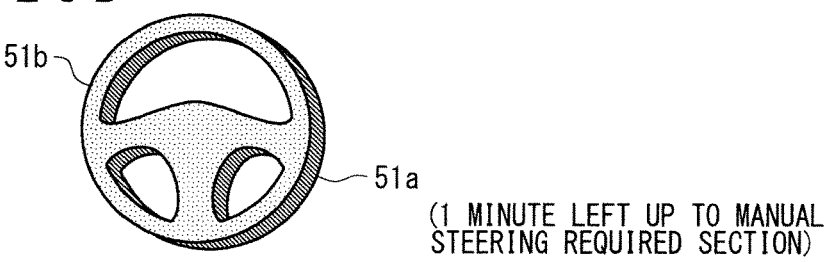
Figure 20E:
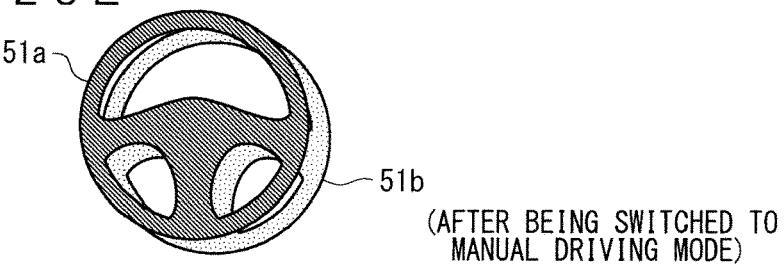

For example, when the steering 51 is in the automatic control mode and more than 20 minutes are left until the subject vehicle reaches the manual steering required section, the manual steering image 51*a* is kept at a predetermined distance (the distance illustrated in FIG. 7) from the automatic steering image 51*b* (FIG. 20A). When 20 minutes are left until then, the manual steering image 51*a* is displayed separate from the automatic steering image 51*b* (FIG. 20B). As the subject vehicle is approaching the manual steering required section, the manual steering image 51*a* is brought closer to the automatic steering image 51*b* (FIGS. 20C and 20D). When the steering 51 is switched to the manual control mode, the manual steering image 51*a* is switched to the closer position, and the manual steering image 51*a* is switched to the deeper position (FIG. 20E). The user may manually switch the steering 51 to the manual control mode. Alternatively, the automatic driving system 30 may automatically switch the steering 51 to the manual control mode when the subject vehicle enters the manual steering required section. Preferably, the automatic driving system 30 automatically switches the steering 51 to the manual control mode after checking whether the driver can manually drive the subject vehicle based on information indicating a state of the driver (e.g., the arousal level, the line of sight, and the limb position).

Figure 21:
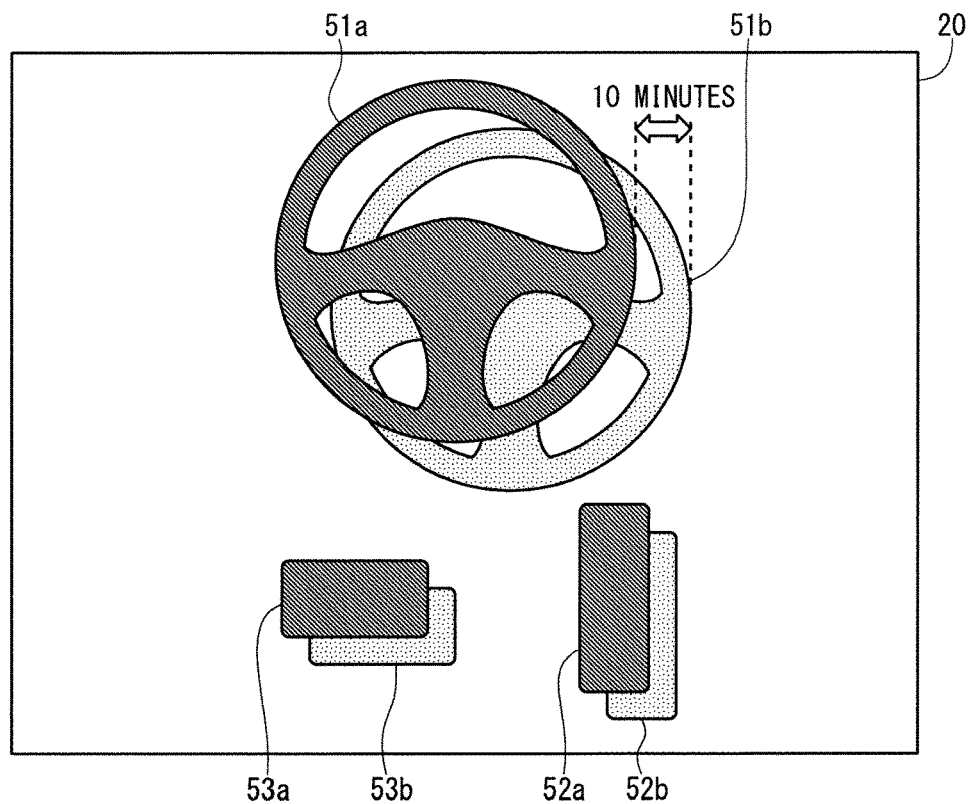
FIG. 21 illustrates a display example of a distance or a time up to an automatic steerable section.

Similarly, a time or a distance until the subject vehicle reaches a section where the steering 51 can be switched to the automatic control mode (an automatic steerable section) may be displayed using a difference (distance) in display position between the automatic steering image 51*b* and the manual steering image 51*a*. FIG. 21 illustrates a display example when the time until the subject vehicle reaches the automatic steerable section is represented by a difference in display position between the manual steering image 51*a* and the automatic steering image 51*b*.

Figure 22:
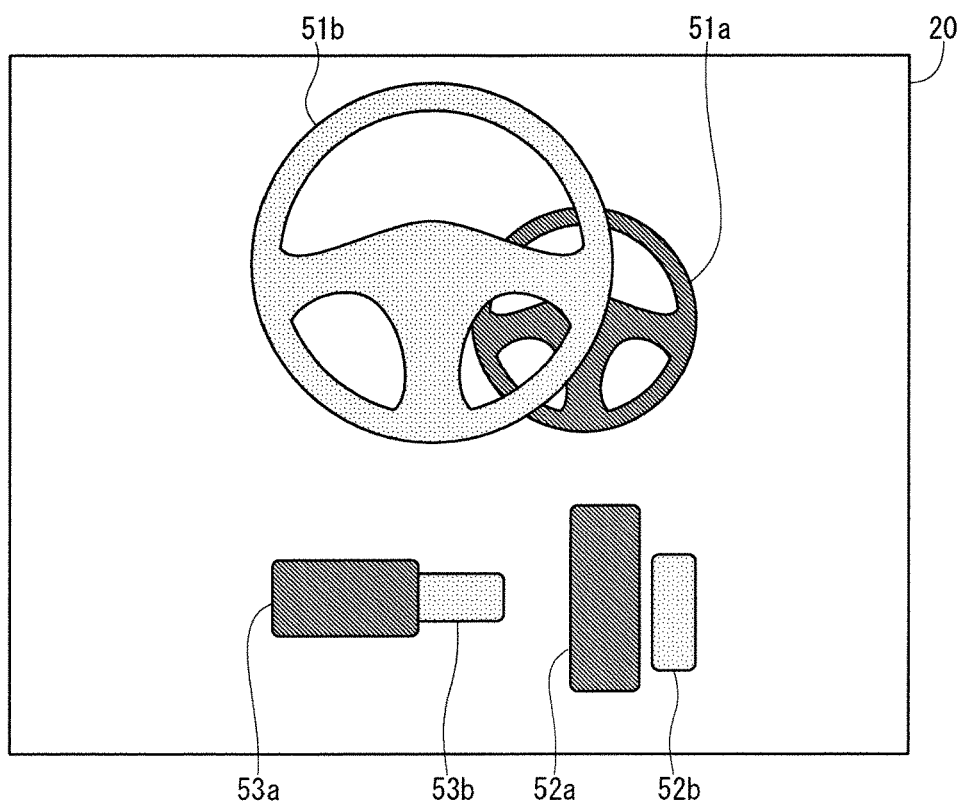
FIG. 22 illustrates a display example of the automatic driving information.

Although the first image and the second image of each of the actuators are displayed overlaid on one another to represent the depth relationship between the images in the display examples above, the first image and the second image may be rendered in perspective to represent the depth relationship between the images. In other words, the image displayed deeper is rendered smaller than that displayed closer. For example, FIG. 22 illustrates the depth relationship between the first image and the second image in perspective. The depth relationship between the first image and the second image can be understood without overlaying the images one another. FIG. 22 clarifies that, for example, the automatic accelerator image 52*b* is displayed deeper though the manual accelerator image 52*a* and the automatic accelerator image 52*b* do not overlap one another. The same image may have different tints in atmospheric perspective, depending on whether the image is displayed closer or deeper.

Embodiment 2

Figure 23:
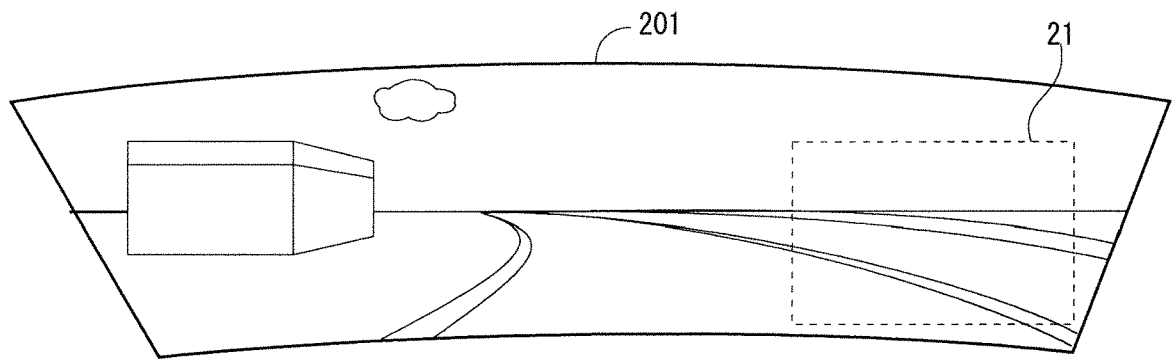
FIG. 23 illustrates an example display area of a display according to Embodiment 2.

Embodiment 2 will describe a driving assistance system including a head up display (HUD) as the display 20. The HUD functioning as the display 20 displays an image on a windshield of a vehicle, so that the image appears as a virtual image in the driver's vision. In other words, the display 20 according to Embodiment 2 forms a display area 21 of an image on a part of the windshield 201 of the subject vehicle as illustrated in FIG. 23.

Figure 24:
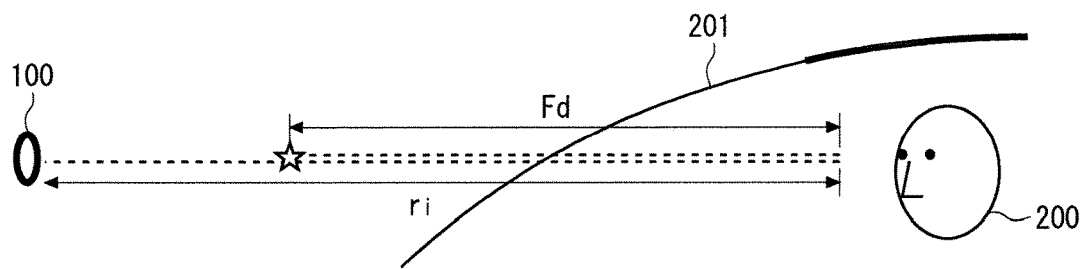
FIG. 24 illustrates operations of a head up display (HUD).

Here, the image (virtual image) displayed by the HUD will be described with reference to FIGS. 24 and 25. The HUD can display an image 100 as a virtual image in a visually identifiable position from the position of a driver 200 of the subject vehicle through the windshield 201 as illustrated in FIG. 24. Although the image 100 is actually displayed on the display area 21 of the windshield 201, the driver 200 views the image 100 as if it was in the scenery ahead of the subject vehicle.

In the DESCRIPTION, an apparent display position of the image 100 when viewed from the driver 200 will be referred to as a "virtual image position". The virtual image position is defined by a virtual image direction that is a direction of the image 100 with respect to the position of the driver 200 and by a virtual image distance that is an apparent distance from the position of the driver 200 to the image 100. Although a reference point for defining the virtual image position is preferably the position of the driver 200, the reference point may be a specific position of the vehicle that can be regarded as the position of the driver 200, for example, the driver's seat, a specific point on the windshield 201, and a position near the driver's eye. The reference point may also be one point in a vehicle space which corresponds to a center point between the eyes of the driver. The center point has been estimated to design the position at which the HUD is to be installed.

Figure 25:
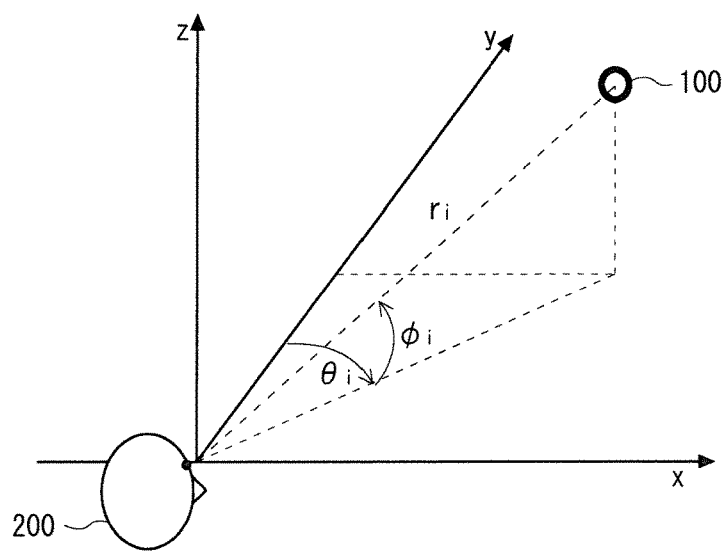
FIG. 25 illustrates the operations of the HUD.

The virtual image direction is substantially equivalent to the position of the image 100 on the windshield 201 when viewed from the driver 200, and is represented by, for example, an angle ($\theta_i$, $\phi_i$) of a three-dimensional polar coordinate system as illustrated in FIG. 25. The virtual image distance is substantially equivalent to an apparent distance to the image 100 when viewed from the driver 200, and is represented by, for example, a radius vector ($r_i$) of the three-dimensional polar coordinate system as illustrated in FIG. 25. The driver 200 can visually identify the image 100 in the virtual image position represented by the three-dimensional polar coordinates ($r_i$, $\theta_i$, $\phi_i$) by adjusting a distance Fd of the focus of his/her eyes to the virtual image distance ($r_i$). Changing the virtual image distance ($r_i$) enables an image with a depth to be displayed.

Figure 26:
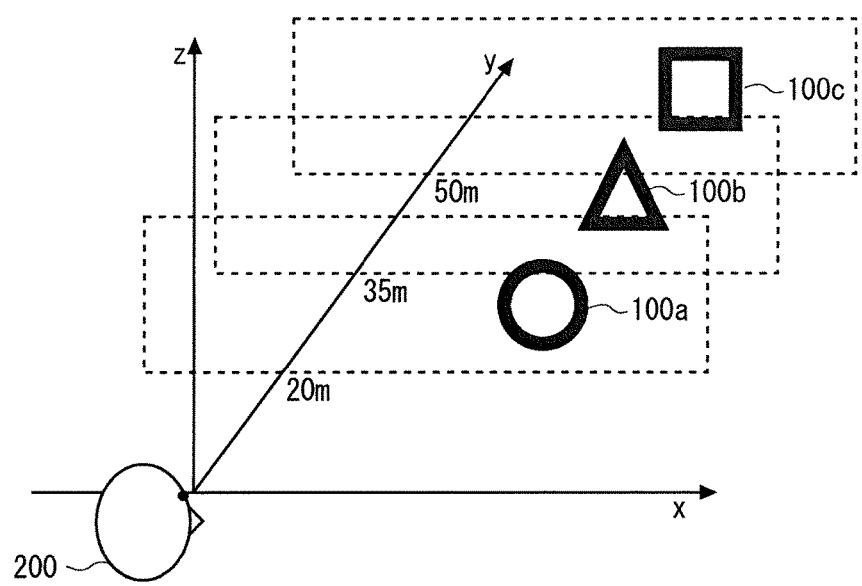
FIG. 26 illustrates the HUD that can change a virtual image distance.

The HUD functioning as the display 20 can simultaneously display a plurality of images with different virtual image distances (depths at display positions) according to Embodiment 2. When a virtual image position is represented by three-dimensional polar coordinates as previously illustrated in FIG. 25, a surface with an equal virtual image distance ($r_i$) forms a spherical surface. However, when the virtual image direction is restricted within a certain area (ahead of a vehicle) as the HUD for vehicle, the surface with the equal virtual image distance may approximate to a plane. In reality, many HUDs are optically designed to make each display surface of a virtual image a plane. In the following description, the surface with the equal virtual image distance will be treated as a plane as illustrated in FIG. 26 (in FIG. 26, the y axis is defined as a traveling direction of a vehicle, and the plane where y=$r_i$ is defined as a display surface with the virtual image distance $r_i$).

Figure 27:
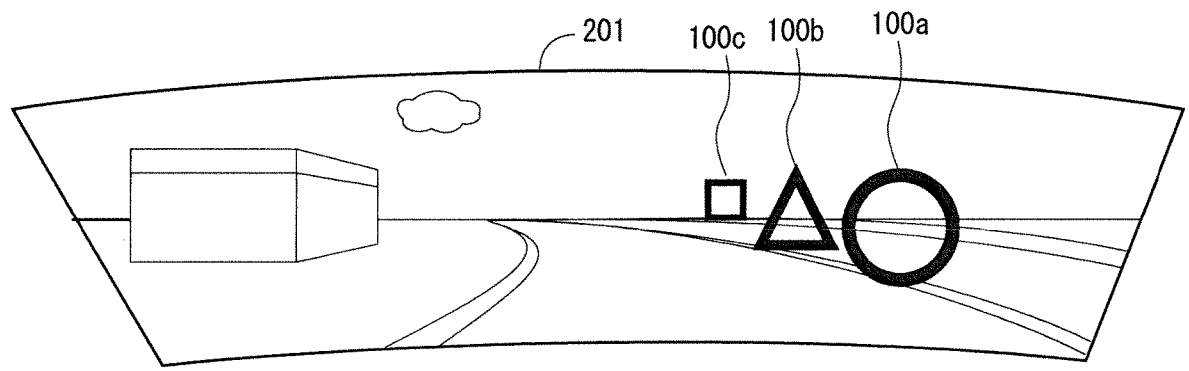
FIG. 27 illustrates the HUD that can change the virtual image distance.

As illustrated in FIG. 27, for example, when the HUD simultaneously displays an image 100a with a virtual image distance of 20 m, an image 100b with a virtual image distance of 35 m, and an image 100c with a virtual image distance of 50 m, the driver views the image 100a, the image 100b, and the image 100c as if they were 20 m ahead, 35 m ahead, and 50 m ahead, respectively.

The operations of the vehicle information display control device 10 are basically the same as those according to Embodiment 1 (FIG. 10). The operations of the vehicle information display control device 10 will be hereinafter described only using the images representing the control modes of the steering 51 (the manual steering image 51a and the automatic steering image 51b) for convenience of illustration.

Figure 28:
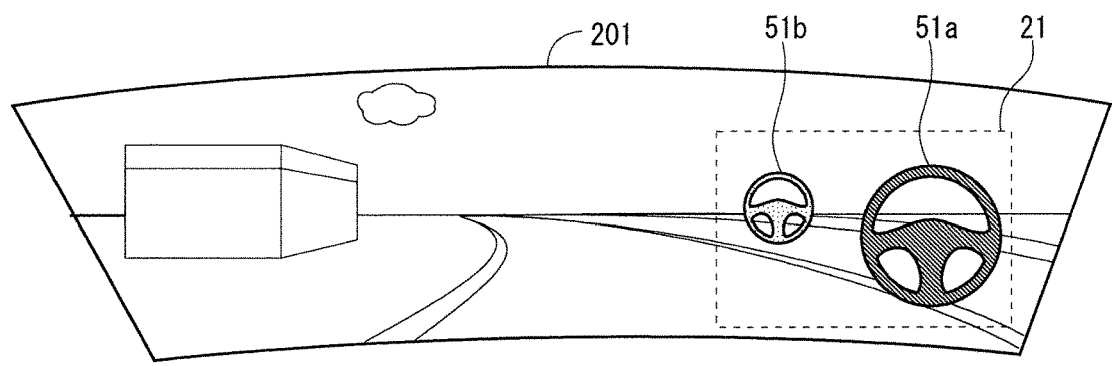
FIG. 28 illustrates a display example of the automatic driving information.
Figure 29:
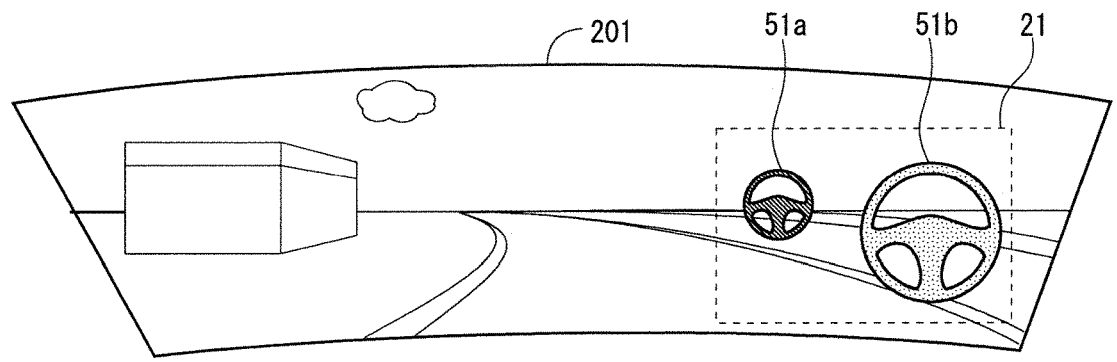
FIG. 29 illustrates a display example of the automatic driving information.

For example, when the steering 51 is in the manual control mode, the display controller 12 displays the manual steering image 51a that is the first image closer, and the automatic steering image 51b that is the second image deeper as illustrated in FIG. 28. Conversely, when the steering 51 is in the automatic control mode, the display controller 12 displays the automatic steering image 51b that is the second image closer, and the manual steering image 51a that is the first image deeper as illustrated in FIG. 29. Here, the virtual image distance of the closer image is set to 20 m, and the virtual image distance of the deeper image is set to 50 m.

Figure 30:
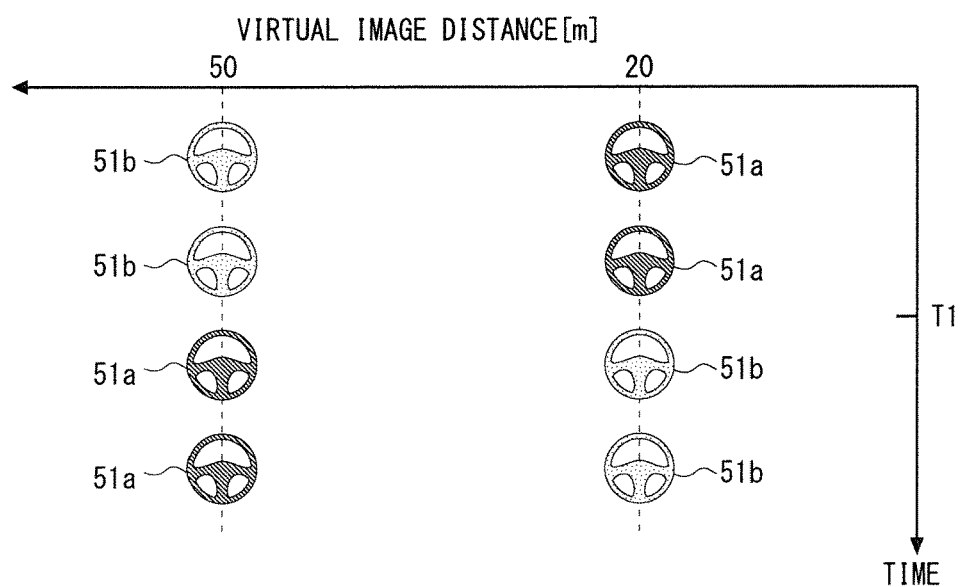
FIG. 30 illustrates example change in the display of the automatic driving information.

In the DESCRIPTION, the movement of the images with depths as illustrated in FIGS. 28 and 29 may be represented by a graph indicating change in the virtual image distance with respect to the time as illustrated in FIG. 30. FIG. 30 illustrates that the display in FIG. 28 has been changed to the display in FIG. 29 at the time T1.

As such, the depth relationship between the manual steering image 51a and the automatic steering image 51b is represented by a difference in virtual image distance (depth at a display position) between the images according to Embodiment 2. Thus, there is no need to display the manual steering image 51a and the automatic steering image 51b overlaid on one another to represent the depth relationship between the images.

Figure 31:
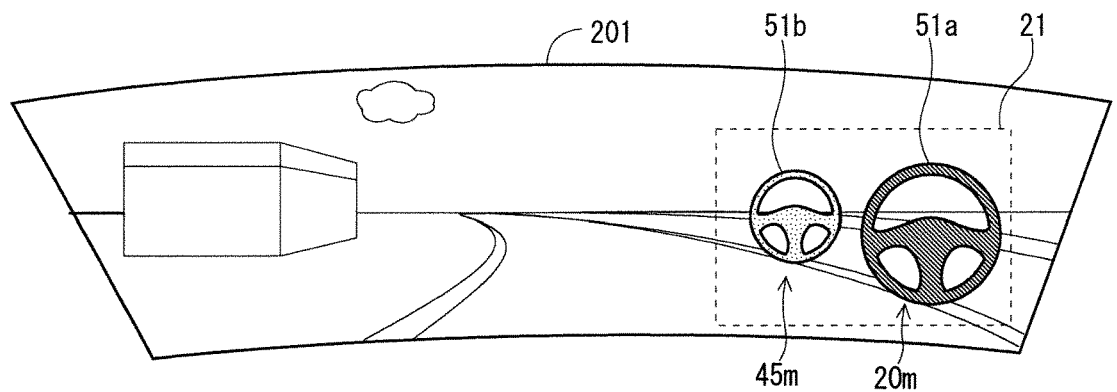
FIG. 31 illustrates a display example of the automatic driving information.
Figure 32:
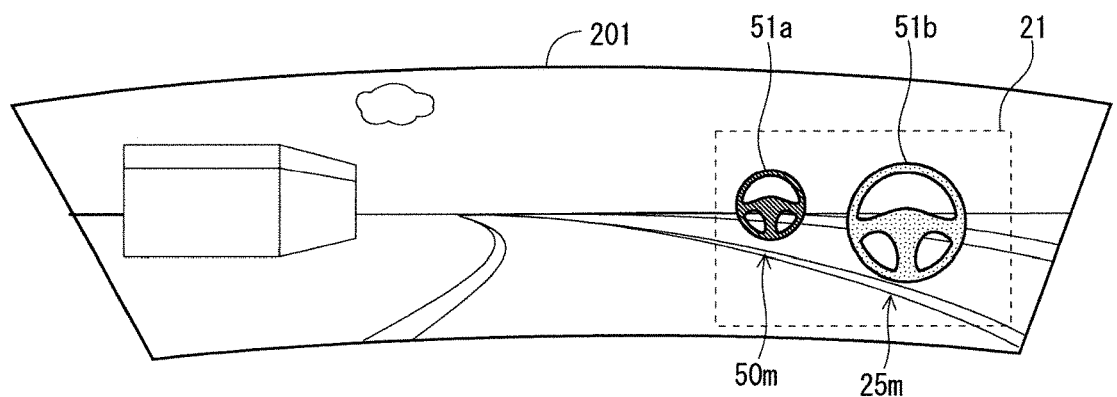
FIG. 32 illustrates a display example of the automatic driving information.
Figure 33:
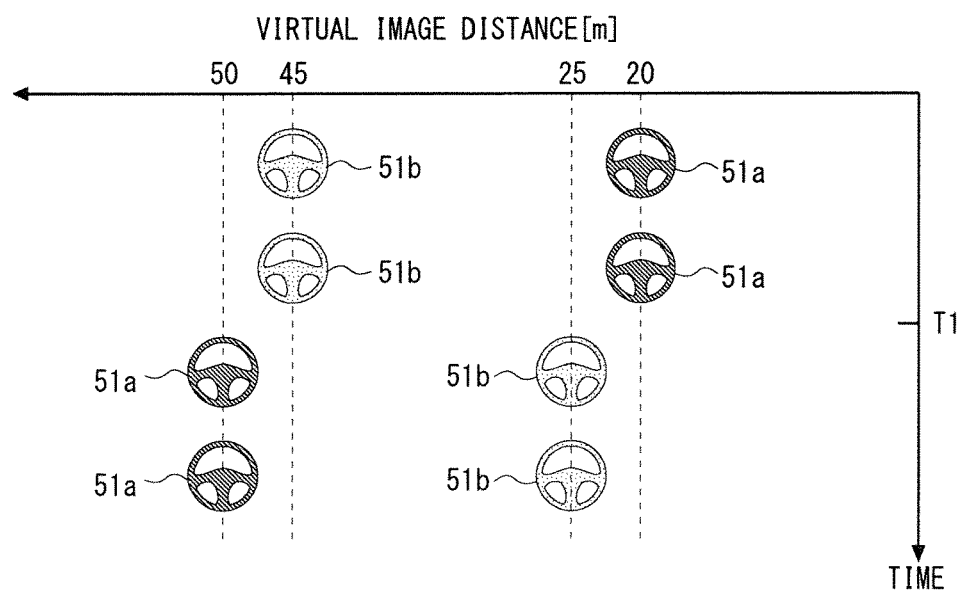
FIG. 33 illustrates example change in the display of the automatic driving information.

Although the virtual image distance of the closer image is set to 20 m and that of the deeper image is set to 50 m in the examples of FIGS. 28 to 30, the distances may be changed according to the control mode. For example, when the steering 51 is in the manual control mode, the virtual image distance of the closer manual steering image 51a may be set to 20 m, and the virtual image distance of the deeper automatic steering image 51b may be set to 45 m as illustrated in FIG. 31. When the steering 51 is in the automatic control mode, the virtual image distance of the closer automatic steering image 51b may be set to 25 m, and the virtual image distance of the deeper manual steering image 51a may be set to 50 m as illustrated in FIG. 32. FIG. 33 illustrates that the display in FIG. 31 has been changed to the display in FIG. 32 at the time T1.

The driving assistance system according to Embodiment 2 also produces the same advantages as those according to Embodiment 1. Since the depth relationship between the first image and the second image of each of the actuators to be displayed on the display 20 is switched according to the control mode of the actuator, the driver can easily understand the control mode of the actuator from the display.

Whether the automatic control mode of each of the actuators allows intervention with a manual operation may be determined from the image displayed on the display 20 also in Embodiment 2. For example, when the steering 51 is in the automatic control mode that allows intervention with a manual operation, the image may be displayed as illustrated in FIG. 29. When the steering 51 is in the automatic control mode that does not allow any intervention with a manual operation, the manual steering image 51a displayed deeper may be displayed in a less prominent mode than that in FIG. 29, similarly as the example illustrated in FIG. 16.

Figure 34:
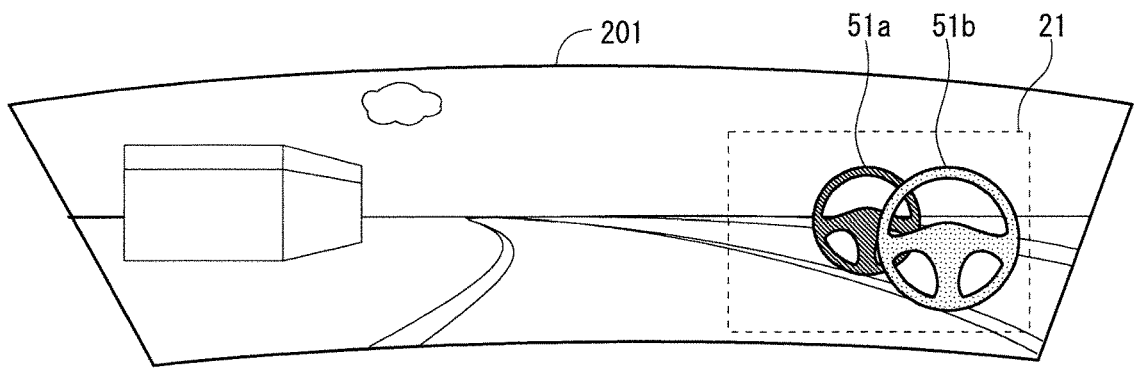
FIG. 34 illustrates a display example of the automatic driving information.
Figure 35:
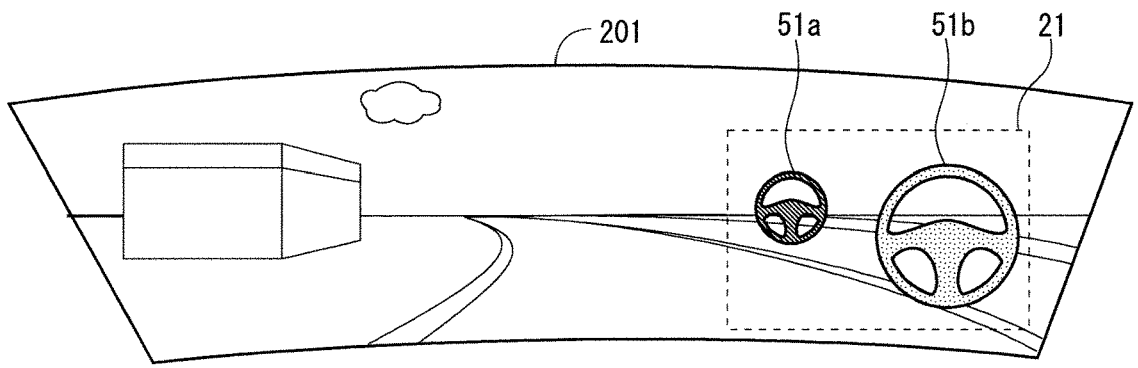
FIG. 35 illustrates a display example of the automatic driving information.

When the steering 51 is in the automatic control mode that allows intervention with a manual operation, the manual steering image 51a may be displayed at a position closer to the automatic steering image 51b (for example, at a position with the virtual image distance of 35 m) as illustrated in FIG. 34. When the steering 51 is in the automatic control mode that does not allow any intervention with a manual operation, as illustrated in FIG. 35, the manual steering image Ma may be displayed at a position more separate from the automatic steering image 51b (for example, at a position with the virtual image distance of 50 m) than that illustrated in FIG. 34.

Figure 36:
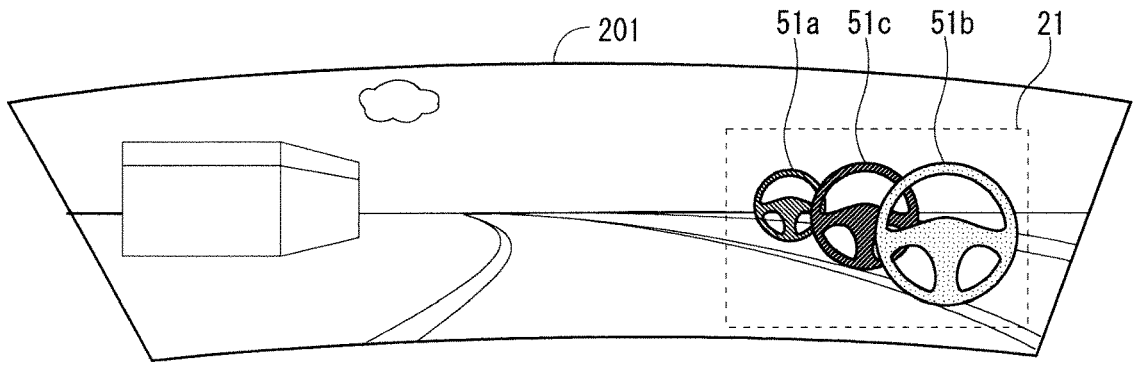
FIG. 36 illustrates a display example of the automatic driving information.
Figure 38:
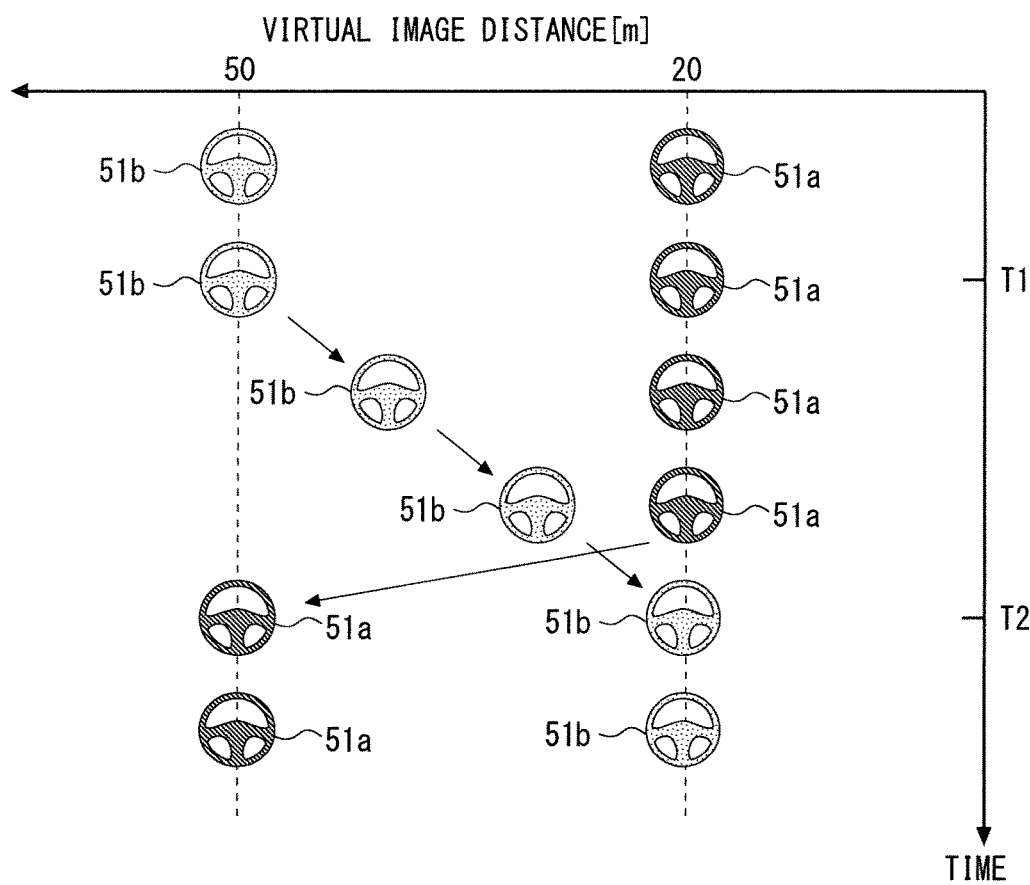
FIG. 38 illustrates the display example of the distance or the time up to the automatic steerable section.

The third image for notifying whether the automatic control mode of each of the actuators allows intervention with a manual operation may be displayed. For example, when the steering 51 is in the automatic control mode that does not allow any intervention with a manual operation, the image may be displayed as illustrated in FIG. 29. When the steering 51 is in the automatic control mode that allows intervention with a manual operation, the notification image 51c may be displayed as the third image between the automatic steering image Mb and the manual steering image 51a as illustrated in FIG. 36.

Through the image displayed on the display 20, the user may be notified of, as the automatic driving information obtained by the vehicle information display control device 10, information on the distance or the time until the actuator in the automatic control mode needs to be switched to the manual control mode and information on the distance or the time until the actuator in the manual control mode can be switched to the automatic control mode also in Embodiment 2.

FIGS. 37A to 37D and 38 illustrate an example of representing the time until the subject vehicle reaches a section where the steering 51 can be switched to the automatic control mode (the automatic steerable section), by a difference in display position (a difference in virtual image distance) between the automatic steering image 51b and the manual steering image 51a. For example, when the steering 51 is in the manual control mode and more than 20 minutes are left (before the time T1 in FIG. 38) until the subject vehicle reaches the automatic steerable section, the deeper automatic steering image 51b is kept at a predetermined distance from the closer manual steering image 51a (FIG. 37A). When less than 20 minutes are left until then, as the subject vehicle is approaching the automatic steerable section, the automatic steering image 51b is brought closer to the manual steering image 51a (FIGS. 37B and 37C). When the subject vehicle enters the automatic steerable section and the steering 51 is switched to the automatic control mode (the time T2 in FIG. 38), the automatic steering image 51b is switched to the closer position, and the manual steering image 51a is switched to the deeper position (FIG. 37D). The user may manually switch the steering 51 to the automatic control mode. Alternatively, the automatic driving system 30 may automatically switch the steering 51 to the automatic control mode when the subject vehicle enters the automatic steerable section.

Similarly, a time or a distance until the subject vehicle reaches a section where the steering 51 needs to be switched to the manual control mode (the manual steering required section) may be represented by a difference in display position (difference in virtual image distance) between the automatic steering image 51b and the manual steering image 51a.

Embodiment 3

Figure 39:
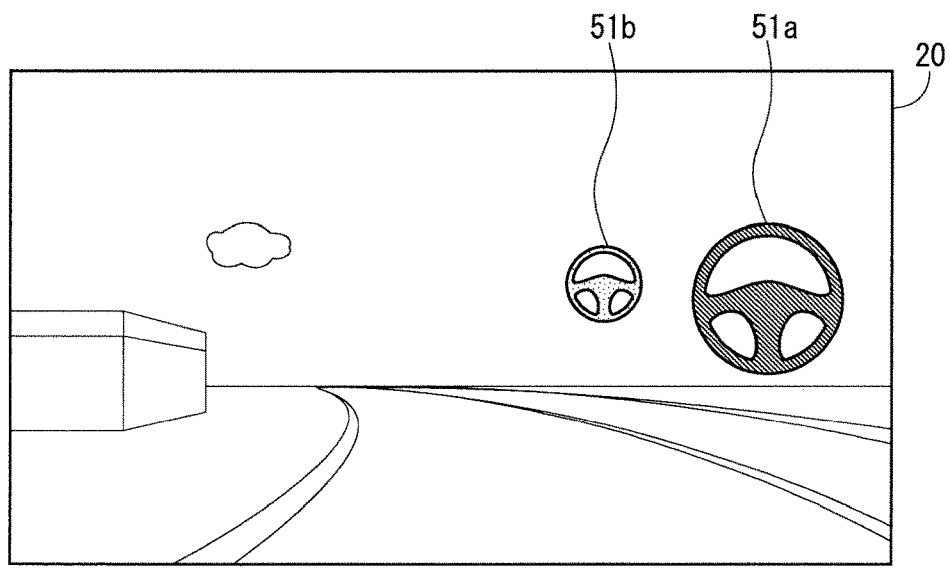
FIG. 39 illustrates an example display according to Embodiment 3.

Devices other than the HUD may be used as the display 20 that can display an image with a depth. For example, an autostereoscopic display (a three-dimensional image display) functioning as the display 20 may achieve depths at display positions of the first image and the second image. Here, a landscape image obtained by capturing an image ahead of the subject vehicle using a camera may be displayed as a background image of the first image and the second image as illustrated in FIG. 39. The landscape image will produce the same visual effect on the screen of the display 20, similarly as that by the HUD.

A liquid crystal display including more than two overlaid display surfaces (display layers; at least the closer display surface is transparent) may achieve the depths at the display positions of the first image and the second image. In other words, the first image of the actuator in the manual control mode is displayed on the closer display surface, and the second image thereof is displayed on the deeper display surface. The second image of the actuator in the automatic control mode is displayed on the closer display surface, and the first image thereof is displayed on the deeper display surface. With a structure enabling the display controller 12 to control the position of at least one of the display surfaces, physically moving the one display surface forward and backward may produce the animation effect in switching the depth relationship between the first image and the second image, or achieve the movement of the images as illustrated in FIGS. 37A to 37D and 38.

Obviously, the automatic driving to which the present invention is applicable includes automatic parking. The automatic driving also includes semi-automatic parking in which a steering wheel operation (steering control) is performed automatically but an accelerator operation needs to be performed manually, and quasi-automatic parking in which all of the steering, the accelerator, and the other actuators are controlled automatically.

Embodiments according to the present invention can be freely combined or appropriately modified and omitted within the scope of the invention.

Although this invention has been described in detail, the description is in all aspects illustrative and does not restrict the invention. Therefore, numerous modifications that have yet been exemplified will be devised without departing from the scope of this invention.

EXPLANATION OF REFERENCE SIGNS 10 vehicle information display control device, 11 automatic driving information obtaining unit, 12 display controller, 20 display, 21 display area, 30 automatic driving system, 31 driving-related information obtaining device, 32 HMI device, 33 automatic driving control device, 40 manual driving device, 41 steering wheel, 42 accelerator pedal, 43 brake pedal, 50 actuator, 51 steering, 52 accelerator, 53 brake, 60 processing circuit, 61 processor, 62 memory, 51a manual steering image, 52a manual accelerator image, 53a manual brake image, 51b automatic steering image, 52b automatic accelerator image, 53b automatic brake image, 51c notification image, 200 driver, 201 windshield, 202 meter cluster.

The invention claimed is:

1. A vehicle information display control device, comprising:
   a memory to store a program and a processor to execute the program to perform the method of:
   defining a first image and a second image for each of the actuators, the first image representing a manual control mode, the second image representing an automatic control mode;
   obtaining automatic driving information including information indicating whether each of actuators of a vehicle is in the manual control mode or the automatic control mode; and
   causing a display to simultaneously display the first image and the second image of each of the actuators and to display, based on the automatic driving information, (i) the first image of an actuator in the manual control mode closer in position to a driver of the vehicle than the second image of the actuator in the manual control mode and (ii) the second image of an actuator in the automatic control mode closer in position to the driver of the vehicle than the first image of the actuator in the automatic control mode.

2. The vehicle information display control device according to claim 1, wherein the processor causes the display to display the first image and the second image overlaid on one another so that a display position of the first image deviates from a display position of the second image.

3. The vehicle information display control device according to claim 1,
wherein the automatic driving information further includes information indicating whether the automatic control mode of each of the actuators allows intervention with a manual operation, and
the processor represents whether the automatic control mode allows intervention with the manual operation, by a display mode or a display position of the first image of the actuator in the automatic control mode.

4. The vehicle information display control device according to claim 1,
wherein the automatic driving information further includes information indicating whether the automatic control mode of each of the actuators allows intervention with a manual operation, and
the processor causes the display to display a third image representing whether the automatic control mode of the actuator in the automatic control mode allows intervention with the manual operation.

5. The vehicle information display control device according to claim 1,
wherein the automatic driving information further includes information on a distance or a time until the actuator in the automatic control mode needs to be switched to the manual control mode, and
the processor represents, by a difference in display position between the first image and the second image, the distance or the time until the actuator in the automatic control mode needs to be switched to the manual control mode.

6. The vehicle information display control device according to claim 1,
wherein the automatic driving information further includes information on a distance or a time until the actuator in the manual control mode can be switched to the automatic control mode, and
the processor represents, by a difference in display position between the first image and the second image, the distance or the time until the actuator in the manual control mode can be switched to the automatic control mode.

7. The vehicle information display control device according to claim 1,
wherein the first image and the second image are identical or similar in shape.

8. The vehicle information display control device according to claim 1,
wherein the first image is more visible than the second image.

9. The vehicle information display control device according to claim 1,
wherein a display mode of each of the first image and the second image is changed, depending on whether the image is displayed closer or deeper.

10. The vehicle information display control device according to claim 1,
wherein the processor uses an animation effect when switching a depth relationship between the first image and the second image.

11. The vehicle information display control device according to claim 1,
wherein the processor renders the first image and the second image in perspective to represent a depth relationship between the first image and the second image.

12. The vehicle information display control device according to claim 1,
wherein the display can display an image with a depth, and
the processor controls depths at display positions of the first image and the second image to represent a depth relationship between the first image and the second image.

13. The vehicle information display control device according to claim 12,
wherein the display is a head up display that can display a plurality of images with different depths.

14. The vehicle information display control device according to claim 12,
wherein the display is a display including a plurality of display layers with physically different depths.

15. The vehicle information display control device according to claim 12,
wherein the display is a three-dimensional image display.

16. A method for displaying automatic driving information to cause a display to display an image representing a control mode of each of actuators of a vehicle, the method comprising:
defining a first image and a second image for each of the actuators, the first image representing a manual control mode, the second image representing an automatic control mode;
obtaining the automatic driving information including information indicating whether each of the actuators is in the manual control mode or the automatic control mode; and
causing the display to simultaneously display the first image and the second image of each of the actuators and to display, based on the automatic driving information, (i) the first image of an actuator in the manual control mode closer in position to a driver of the vehicle than the second image of the actuator in the manual control mode and (ii) the second image of an actuator in the automatic control mode closer in position to the driver of the vehicle than the first image of the actuator in the automatic control mode.

* * * * *